(12) United States Patent
Koyama et al.

(10) Patent No.: US 12,313,737 B2
(45) Date of Patent: May 27, 2025

(54) OBJECT DETECTION APPARATUS AND OBJECT DETECTION METHOD

(71) Applicant: DENSO CORPORATION, Kariya (JP)

(72) Inventors: Yu Koyama, Nisshin (JP); Mitsuyasu Matsuura, Nisshin (JP); Satoru Noro, Kariya (JP); Tetsuya Aoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 155 days.

(21) Appl. No.: 17/645,570

(22) Filed: Dec. 22, 2021

(65) Prior Publication Data

US 2022/0113404 A1 Apr. 14, 2022

Related U.S. Application Data

(63) Continuation of application No. PCT/JP2020/021774, filed on Jun. 2, 2020.

(30) Foreign Application Priority Data

Jun. 26, 2019 (JP) ................................ 2019-118735

(51) Int. Cl.
  *G01S 15/52* (2006.01)
  *G01S 15/931* (2020.01)

(52) U.S. Cl.
  CPC ............ *G01S 15/523* (2013.01); *G01S 15/52* (2013.01); *G01S 15/931* (2013.01)

(58) Field of Classification Search
  CPC .......... G01S 15/00; G01S 15/04; G01S 15/52; G01S 15/102; G01S 15/104;
  (Continued)

(56) References Cited

U.S. PATENT DOCUMENTS

2006/0025897 A1* 2/2006 Shostak ................. G08G 1/017
  701/1
2008/0106458 A1* 5/2008 Honda ..................... G01S 7/023
  342/59
(Continued)

FOREIGN PATENT DOCUMENTS

DE 10106142 A1 8/2002
JP H09-021869 A 1/1997
(Continued)

OTHER PUBLICATIONS

NPL Search (Oct. 12, 2023).*

*Primary Examiner* — Van T Trieu
(74) *Attorney, Agent, or Firm* — Maschoff Brennan

(57) ABSTRACT

An object detection apparatus detects an object in a vicinity of a moving body to which it is mounted. In the object detection apparatus, first drive signal and second drive signals for driving a transmitting unit are generated and outputted to the transmitting unit. The first drive signal corresponds to a first transmission wave included in a plurality of transmission waves that are continuously transmitted from a start to an end of a transmission process of the transmission wave, and respectively encoded based on waveform patterns. The second drive signal corresponds to a second transmission wave included in the plurality of transmission waves and transmitted after the first transmission wave. Reception determination regarding the reflected wave is performed based on a frequency signal, corresponding to a waveform pattern of the reception signal, and a reference signal that corresponds to a waveform pattern of the first drive signal.

9 Claims, 11 Drawing Sheets

(58) Field of Classification Search
CPC ...... G01S 15/523; G01S 15/32; G01S 15/931;
G01S 15/586; G01S 17/10; G01S 17/89;
G01S 17/931
See application file for complete search history.

(56) References Cited

U.S. PATENT DOCUMENTS

| | | |
|---|---|---|
| 2010/0046325 A1 | 2/2010 | Martin |
| 2020/0011734 A1* | 1/2020 | Lee ........................... G01J 3/18 |
| 2020/0142073 A1* | 5/2020 | Gassend ................. G01S 17/89 |
| 2021/0055397 A1* | 2/2021 | Matsuura ................ G01S 15/04 |

FOREIGN PATENT DOCUMENTS

| | | |
|---|---|---|
| JP | 2006-284257 A | 10/2006 |
| WO | 2010/063510 A1 | 6/2010 |

* cited by examiner

OBJECT DETECTION APPARATUS AND OBJECT DETECTION METHOD

CROSS-REFERENCE TO RELATED APPLICATIONS

The present application is a continuation application of International Application No. PCT/JP2020/021774, filed on Jun. 2, 2020, which claims priority to Japanese Patent Application No. 2019-118735, filed on Jun. 26, 2019. The contents of these applications are incorporated herein by reference in their entirety.

BACKGROUND

Technical Field

The present disclosure relates to an object detection apparatus that detects an object in a vicinity of a moving body and an object detection method.

Related Art

An apparatus that detects an object using an ultrasonic sensor is known. When this type of object detection apparatus is mounted in a vehicle and used for obstacle detection, detection accuracy regarding the object may decrease as a result of interference and the like. For example, interference may occur when an ultrasonic sensor that is mounted in an own vehicle receives an ultrasonic wave that is transmitted from an ultrasonic sensor that is mounted in another vehicle that is present in the vicinity of the own vehicle. Alternatively, for example, interference may occur when one of a plurality of ultrasonic sensors that are mounted in the own vehicle receives an ultrasonic wave that is transmitted from another of the plurality of ultrasonic sensors.

SUMMARY

One aspect of the present disclosure provides an object detection apparatus is configured to detect an object in a vicinity of a moving body to which it is mounted. The object detection apparatus includes a drive-signal generating unit and a detecting unit. The drive-signal generating unit is provided so as to generate a drive signal that drives a transmitting unit that includes a transmitter that transmits a transmission wave that is an ultrasonic wave externally, and output the drive signal to the transmitting unit. The detecting unit is provided to detect the object based on a reception signal that corresponds to a reception result of a receiver that receives a reception wave that includes a reflected wave from the object of the transmission wave.

The drive-signal generating unit generates a first drive signal that is the drive signal that corresponds to a first transmission wave that is included in a plurality of transmission waves that are continuously transmitted from a start of a transmission process of the transmission wave to an end of the transmission process, and respectively encoded based on waveform patterns, and outputs the first drive signal to the transmitting unit. The drive-signal generating unit also generates a second drive signal that is the drive signal that corresponds to a second transmission wave that is included in the plurality of transmission waves and transmitted after the first transmission wave, and outputs the second drive signal to the transmitting unit.

The detecting unit performs reception determination regarding the reflected wave based on a frequency signal that corresponds to a waveform pattern of the reception signal and a reference signal that corresponds to a waveform pattern of the first drive signal.

DESCRIPTION OF THE EMBODIMENTS

Figure 1:
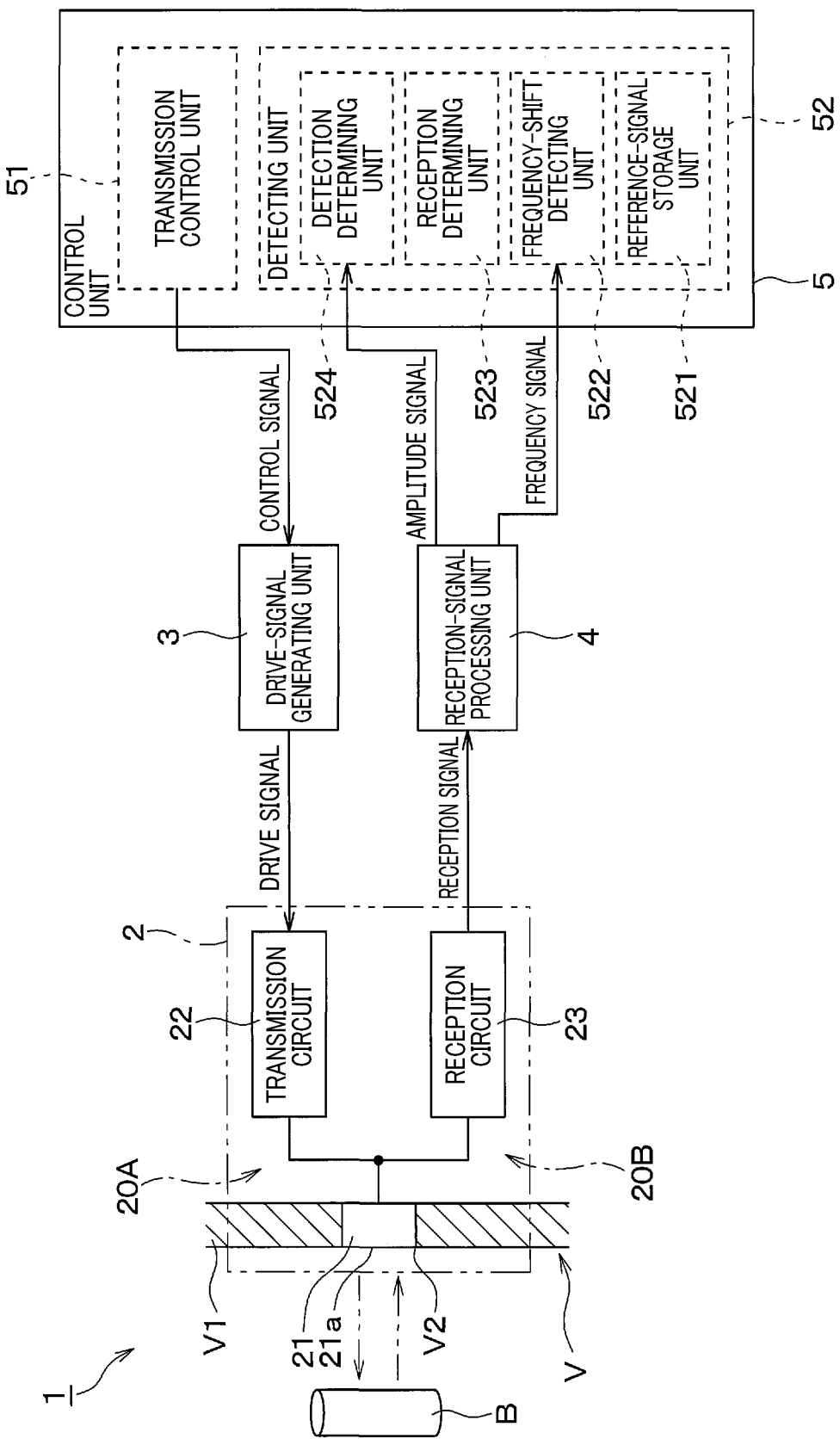
FIG. 1 is a block diagram illustrating an overall configuration of an object detection apparatus according to a first embodiment.

Here, DE 10106142 A1 discloses an ultrasonic multi-sensor array. The ultrasonic multi-sensor array described in DE 10106142 A1 includes at least two transmitting units and at least a single receiving unit. Some of the transmitting units are capable of parallel operation.

In the ultrasonic multi-sensor array described in DE 10106142 A1, ultrasonic pulses are encoded to enable parallel operation. Specifically, a frequency of a carrier-wave signal is linearly modulated for pulse-encoding in each of the plurality of transmitting units that are simultaneously operated. That is, a frequency of a carrier-wave signal of a first transmitting unit is linearly increased during a pulse duration. Meanwhile, a frequency of a carrier-wave signal of a second transmitting unit is linearly decreased during the pulse duration.

Through use of the technology disclosed in DE 10106142 A1, the ultrasonic sensor that is mounted in the own vehicle is capable of identifying whether a reception wave is a reflected wave of an own transmission wave. Specifically, this identification is performed based on whether the reception wave includes a change in frequency that is similar to the change in frequency in the own transmission wave. If desired identification accuracy is obtained, issues of interference such as that described above can be resolved.

However, in an object detection apparatus and an object detection method such as that described above in which transmission and reception of ultrasonic waves is used, further improvement in identification accuracy is required. The present disclosure has been achieved in light of issues given as examples above and the like. That is, for example, the present disclosure may provide an apparatus configuration and a method that are capable of improving identification accuracy from that in the past.

A first exemplary embodiment of the present disclosure provides an object detection apparatus is configured to detect an object in a vicinity of a moving body to which it is mounted. The object detection apparatus includes: a drive-signal generating unit that is provided so as to generate a drive signal that drives a transmitting unit that includes a transmitter that transmits a transmission wave that is an ultrasonic wave externally, and output the drive signal to the transmitting unit; and a detecting unit that is provided to detect the object based on a reception signal that corresponds to a reception result of a receiver that receives a reception wave that includes a reflected wave from the object of the transmission wave.

The drive-signal generating unit generates a first drive signal that is the drive signal that corresponds to a first transmission wave that is included in a plurality of transmission waves that are continuously transmitted from a start of a transmission process of the transmission wave to an end of the transmission process, and respectively encoded based on waveform patterns, and outputs the first drive signal to the transmitting unit.

The drive-signal generating unit also generates a second drive signal that is the drive signal that corresponds to a second transmission wave that is included in the plurality of transmission waves and transmitted after the first transmission wave, and outputs the second drive signal to the transmitting unit. The detecting unit performs reception determination regarding the reflected wave based on a frequency signal that corresponds to a waveform pattern of the reception signal and a reference signal that corresponds to a waveform pattern of the first drive signal.

A second exemplary embodiment of the present disclosure provides an object detection method for detecting an object in a vicinity of a moving body. The object detection method includes using a drive-signal generating unit and a detecting unit. The drive-signal generating unit is provided so as to generate a drive signal that drives a transmitting unit that includes a transmitter that transmits a transmission wave that is an ultrasonic wave externally, and output the drive signal to the transmitting unit. The detecting unit is provided to detect the object based on a reception signal that corresponds to a reception result of a receiver that receives a reception wave that includes a reflected wave from the object of the transmission wave.

The object detection method includes: generating, by the drive-signal generating unit, a first drive signal that is the drive signal that corresponds to a first transmission wave that is included in a plurality of transmission waves that are continuously transmitted from a start of a transmission process of the transmission wave to an end of the transmission process, and respectively encoded based on waveform patterns, and outputting the first drive signal towards the transmitting unit; generating, by the drive-signal generating unit, a second drive signal that is the drive signal that corresponds to a second transmission wave that is included in the plurality of transmission waves and transmitted after the first transmission wave, and outputting the second drive signal towards the transmitting unit; and performing, by the detecting unit, reception determination regarding the reflected wave based on a frequency signal that corresponds to a waveform pattern of the reception signal and a reference signal that corresponds to a waveform pattern of the first drive signal.

Here, in each section of the application documents, elements may be given reference numbers that are in parentheses. However, these reference numbers merely indicate examples of corresponding relationships between the elements and specific means described according to the embodiment described hereafter. Therefore, the present disclosure is not limited in any way by the above-described reference numbers.

EMBODIMENTS

Embodiments of the present disclosure will hereinafter be described with reference to the drawings. Here, regarding various variation examples that are applicable to an embodiment, understanding of the embodiment may be hindered if the variation examples are inserted in the middle of a series of descriptions related to the embodiment. Therefore, the variation examples are collectively described following the description of the embodiment.

First Embodiment: Configuration

With reference to FIG. 1, an object detection apparatus 1 is configured to detect an object B in the vicinity of a vehicle V by being mounted in the vehicle V that serves as a moving body. A state in which the object detection apparatus 1 is mounted in the vehicle V is referred to, hereafter, as an "onboard state". In addition, the vehicle V in which the object detection apparatus 1 according to the present embodiment is mounted is referred to, hereafter, as an "own vehicle".

The object detection apparatus 1 has a configuration as a so-called ultrasonic sensor. Specifically, the object detection apparatus 1 is configured to transmit a transmission wave that is an ultrasonic wave towards the outside. In addition, the object detection apparatus 1 is configured to detect the object B that is in the vicinity and acquire distance measurement information that corresponds to the object B by receiving a reflected wave from the object B of the transmission wave that is transmitted outside.

The object detection apparatus 1 includes a transmitting/receiving unit 2, a drive-signal generating unit 3, a reception-signal processing unit 4, and a control unit 5. The object detection apparatus 1 has a configuration in which the transmitting/receiving unit 2, the drive-signal generating unit 3, the reception-signal processing unit 4, and the control unit 5 are supported by a single sensor casing.

According to the present embodiment, the object detection apparatus 1 has an integrated transmission/reception-type configuration. That is, by being provided with the single transmitting/receiving unit 2, the object detection apparatus 1 is configured to provide a transmission/reception function through the transmitting/receiving unit 2. Specifically, the transmitting/receiving unit 2 includes a transmitting unit 20A and a receiving unit 20B. In addition, the transmitting/receiving unit 2 includes a single transducer 21. The transmitting unit 20A and the receiving unit 20B are configured to respectively actualize a transmission function and a reception function using the shared transducer 21.

The transducer 21 provides a function as a transmitter that transmits the transmission wave towards the outside and a function as a receiver that receives a reception wave that includes the reflected wave of the transmission wave from the object B. Specifically, the transducer 21 is configured as an ultrasonic microphone in which an electrical-mechanical energy conversion element, such as a piezoelectric element, is provided inside a microphone casing that has a substantially circular cylindrical shape.

In the onboard state, the transducer 21 is arranged in a position that faces outward from an outer surface of the own vehicle. As a result, the transducer 21 is provided so as to be capable of transmitting the transmission wave outside the own vehicle and receiving the reflected wave from outside the own vehicle. Specifically, in the onboard state, the transducer 21 is mounted in an outer plate member V1 such that a transmission/reception surface 21a is exposed to external space of the own vehicle from a mounting hole V2 that is a through-hole that is formed in the outer plate member V1 of the own vehicle.

For example, the outer plate member V1 may be a bumper or a body panel, and is formed by a synthetic resin or metal. The transmission/reception surface 21a is an outer surface of the microphone casing of the transducer 21, and is provided so as to function as a transmission surface for transmission waves and a reception surface for reception waves.

The transmitting/receiving unit 2 includes the transducer 21, a transmission circuit 22, and a reception circuit 23. The transducer 21 is electrically connected to the transmission circuit 22 and the reception circuit 23. The transmitting unit 20A is configured by the transducer 21 and the transmission circuit 22. In addition, the receiving unit 20B is configured by the transducer 21 and the reception circuit 23.

The transmission circuit 22 is provided so as to drive the transducer 21 based on an inputted drive signal and thereby make the transducer 21 transmit a transmission wave at a frequency that corresponds to a frequency of the drive signal. The frequency of the drive signal is referred to, hereafter, as a "drive frequency". Specifically, the transmission circuit 22 has a digital/analog conversion circuit and the like. That is, the transmission circuit 22 is configured to generate an element input signal by performing signal processing, such as digital/analog conversion, on the drive signal that is inputted from the drive-signal generating unit 3.

The element input signal is an alternating-current voltage signal for driving the transducer 21, that is, the electrical-mechanical energy conversion element that is provided in the transducer 21. In addition, the transmission circuit 22 is configured to excite the transmission/reception surface 21a and transmit the transmission wave outside, by applying the generated element input signal to the transducer 21 and driving the electrical-mechanical energy conversion element in the transducer 21.

The reception circuit 23 is provided so as to generate a reception signal that corresponds to a reception result of a reception wave by the transducer 21 and output the reception signal to the reception-signal processing unit 4. Specifically, the reception circuit 23 includes an amplifier circuit, an analog/digital conversion circuit, and the like. That is, the reception circuit 23 is configured to generate the reception signal by performing signal processing, such as amplification and analog/digital conversion, on an element output signal that is outputted from the transducer 21.

The element output signal is an alternating-current voltage signal that is generated in the electrical-mechanical energy conversion element that is provided in the transducer 21 when the transmission/reception surface 21a is excited by reception of a reception wave. In addition, the reception circuit 23 is configured to output the generated reception signal that includes information related to an amplitude and a frequency of the reception wave, to the reception-signal processing unit 4.

In this manner, the transmitting/receiving unit 2 is configured to generate a reception signal that is based on the frequency of the reception wave and a distance between the transducer 21 and the object B, by transmitting the transmission wave and receiving the reflected wave from the object B as the reception wave, through the transducer 21. The reception wave when the transducer 21 that serves as the transmitter/receiver receives the reflected wave of the transmission wave that is transmitted by the transducer 21 itself is referred to, hereafter, as a "regular wave". In contrast, a reception wave that is attributed to a transmission wave from another apparatus is referred to, hereafter, as an "irregular wave". The "other apparatus" includes another transducer that is mounted in the own vehicle.

The drive-signal generating unit 3 is provided so as to generate a drive signal based on a control signal that is received from the control unit 5 and output the drive signal towards the transmitting unit 20A. The drive signal is a signal for driving the transmitting unit 20A and transmitting the transmission wave from the transducer 21. For example, the drive signal may be a pulse-like signal that has a frequency that is within an ultrasonic band. A specific example of the drive signal will be described in a section for a description of an operation overview, described hereafter. The control signal is a signal for controlling output of the drive signal from the drive-signal generating unit 3 to the transmitting unit 20A.

The drive-signal generating unit 3 is configured to generate and output a drive signal that corresponds to a waveform pattern of the transmission wave that is encoded based on the waveform pattern. In addition, the drive-signal generating unit 3 is configured to be capable of selectively generating and outputting a plurality of types of drive signals that have waveform patterns that differ from one another.

Furthermore, the drive-signal generating unit 3 is configured to be capable of continuously generating and outputting a plurality of drive signals from a start of a transmission process of the transmission wave to an end of the transmission process. Each of the plurality of drive signals that are outputted from the start of the transmission process to the end of the transmission process of the transmission wave is referred to, hereafter, as a "segmented drive signal". Details of the segmented drive signal will be described in the section for the description of an operation overview, described hereafter.

According to the present embodiment, the drive-signal generating unit 3 generates a drive signal in which at least a leading transmission wave is encoded by frequency modulation. The "leading transmission wave" is a transmission wave that is transmitted first among a plurality of transmission waves that are continuously transmitted from the start of the transmission process to the end of the transmission process. Among the plurality of transmission waves that are continuously transmitted from the start of the transmission process to the end of the transmission process, a transmission wave that is transmitted after the leading transmission wave is referred to as a "subsequent transmission wave".

The leading transmission wave corresponds to a "first transmission wave". The subsequent transmission wave corresponds to a "second transmission wave". The leading transmission wave and the subsequent transmission wave that are continuously transmitted from the start of the transmission process to the end of the transmission process of a single transmission wave may be generally referred to, hereafter, as a "segmented transmission wave". Details of the segmented transmission wave will be described in the section for the description of an operation overview, described hereafter.

Specifically, the drive-signal generating unit 3 generates a drive signal in which the leading transmission wave is a chirp wave, and the subsequent transmission wave is a chirp wave or a CW wave. A chirp wave is a wave of which the frequency increases or decreases with the elapse of time. A CW wave is a wave of which the frequency is fixed. CW is an abbreviation of continuous waveform. A CW wave is also referred to as a CF wave. CF is an abbreviation of continuous frequency.

In this manner, the drive-signal generating unit 3 generates and outputs a drive signal in which each of a plurality of segmented transmission waves that are continuously transmitted from the start of the transmission process to the end of the transmission process is encoded based on a frequency modulation mode. That is, the drive-signal generating unit 3 encodes the transmission wave by a plurality of bits of which a number of bits corresponds to a number of segmented transmission waves. In addition, according to the present embodiment, the drive-signal generating unit 3 generates and outputs a drive signal in which the leading transmission wave is a V-shaped chirp wave. The V-shaped chirp wave is a wave in which the frequency changes in a V-shape or an inverted V-shape with the elapse of time.

The reception-signal processing unit 4 is configured to generate an amplitude signal and a frequency signal by performing a process, such as FFT, on the reception signal. FFT is an abbreviation of Fast Fourier Transform. The amplitude signal is a signal that corresponds to the amplitude of the reception wave. The frequency signal is a signal that corresponds to the frequency of the reception wave. That is, the frequency signal is a signal that corresponds a waveform pattern that is related to encoding of the reception signal.

The control unit 5 is provided so as to control an overall operation of the object detection apparatus 1. Specifically, according to the present embodiment, the control unit 5 is a known microcomputer and includes a CPU, a ROM, a non-volatile rewritable memory, a RAM, an input/output interface, and the like. That is, the control unit 5 is configured to perform various processes by reading and running a program that is stored in the ROM or the non-volatile rewritable memory.

Here, CPU is an abbreviation of central processing unit. ROM is an abbreviation of read only memory. For example, the non-volatile rewritable memory may be an EPROM, EEPROM, a flash memory, or the like. EPROM is an abbreviation of erasable programmable read only memory. EEPROM is an abbreviation of electrically erasable programmable read only memory. RAM is an abbreviation of random access memory. The ROM, the non-volatile rewritable memory, and the RAM are non-transitory computer-readable storage media.

The control unit 5 is configured to control transmission of the transmission wave and detect the object B based on the reception wave. Specifically, the control unit 5 includes a transmission control unit 51 and a detecting unit 52 as functional configurations that are actualized on the microcomputer.

The transmission control unit 51 is configured to control a transmission state of the transmission wave from the transmitting unit 20A by outputting a control signal to the drive-signal generating unit 3. Specifically, the transmission control unit 51 sets a waveform pattern and an output timing of the drive signal that is generated and outputted by the drive-signal generating unit 3, by the control signal.

The detecting unit 52 is provided so as to detect the object B based on the reception signal that outputted from the reception circuit 23. Specifically, the detecting unit 52 determines whether the reception wave is a regular wave based on the frequency signal that is outputted from the reception-signal processing unit 4 and a predetermined reference signal. In addition, when the reception wave is a regular wave, the detecting unit 52 detects presence of the object B and the distance between the transducer 21 and the object B based on the amplitude signal that is outputted from the reception-signal processing unit 4. Specifically, according to the present embodiment, the detecting unit 52 includes a reference-signal storage unit 521, a frequency-shift detecting unit 522, a reception determining unit 523, and a detection determining unit 524.

A reference signal that corresponds to the waveform pattern of the drive signal is housed in the reference-signal storage unit 521. Details of the reference signal will be described in the section for the description of an operation overview, described hereafter. The frequency-shift detecting unit 522 detects a frequency shift amount between the transmission wave and the reflected wave that is based on a relative velocity that accompanies relative movement between the own vehicle and the object B. Details of the detection of the frequency shift amount will be described in the section for the description of an operation overview, described hereafter The reception determining unit 523 performs reception determination regarding the reflected wave based on the reference signal, the frequency signal that corresponds to the waveform pattern of the reception signal, and the frequency shift amount that is detected by the frequency-shift detecting unit 522. Specifically, the reception determining unit 523 determines whether the reception wave is a regular wave by performing pattern matching between the waveform of the frequency signal and the waveform of the reference signal while taking into consideration the detected frequency shift amount. Details of a determination operation by the reception determining unit 52 will be described in the section for the description of an operation overview, described hereafter.

The detection determining unit 524 detects the presence of the object B when the reception determining unit 523 determines that the reception wave is a regular wave and the amplitude signal is equal to or greater than a predetermined determination threshold. In addition, when the presence of the object B is detected, the detection determining unit 524 generates the distance measurement information that corresponds to the distance between the transducer 21 and the object B based on the amplitude signal.

First Embodiment: Operation Overview

An overview of operations of the configuration according to the present embodiment will be described below with reference to the drawings, together with typical operation examples and effects achieved by the configuration.

When a predetermined object detection condition is met, the object detection apparatus 1 starts an object detection operation. For example, the object detection condition may include a traveling speed of the own vehicle being within a predetermined range, a shift position of the own vehicle being a traveling position that includes reverse, and the like. When the object detection condition is not met, the object detection apparatus 1 ends the object detection operation.

During the object detection operation, the transmission control unit 51 determines arrival of a transmission-process start timing at a predetermined cycle. For example, the predetermined cycle may be several hundred milliseconds. Determination of the arrival of the transmission-process start timing is performed using a clocking means such as a timer. When the transmission-process start timing arrives, the transmission control unit 51 outputs a control signal towards the drive-signal generating unit 3. As a result, the transmission process is performed.

Specifically, when the control signal is inputted, the drive-signal generating unit 3 generates a drive signal and outputs the drive signal towards the transmitting unit 20A, that is, the transmission circuit 22. The transmission circuit 22 drives the transducer 21 based on the inputted drive signal. Then, the transducer 21 that functions as a transmitter transmits a transmission wave that is an ultrasonic wave of a frequency that corresponds to the frequency of the drive signal towards the outside of the own vehicle. In this manner, the object detection apparatus 1 repeatedly transmits the transmission waves at a predetermined cycle during the object detection operation.

Therefore, the above-described predetermined cycle is also referred to as a "transmission cycle." Here, ideally, the frequency of the transmission wave substantially coincides with the frequency of the drive signal. However, a slight difference or delay occurs between the frequency of the transmission wave and the drive frequency due to a tracking relationship of the transmitting unit 20A that includes the transducer 21 in relation to the drive frequency.

Figure 2:
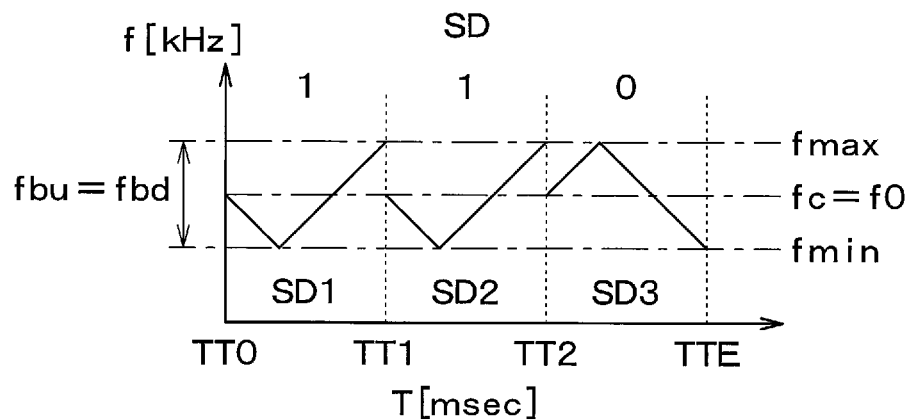
FIG. 2 is a timing chart illustrating frequency characteristics in an example of a drive signal that is outputted from a drive-signal generating unit shown in FIG. 1.

FIG. 2 shows an example of a drive signal SD that is outputted from the drive-signal generating unit 3 from the start of the transmission process to the end of the transmission process in a single transmission process. In FIG. 2 and the like, a vertical axis f indicates frequency and a horizontal axis T indicates time.

As shown in FIG. 2, in the present operation example, the drive signal SD includes three segmented drive signals SD1 to SD3 from a transmission-process start timing TT0 to a transmission-process end timing TTE. That is, in the present operation example, the drive-signal generating unit 3 outputs the drive signal SD that includes the three segmented drive signals SD1 to SD3 at a predetermined cycle. The segmented drive signal SD1 and the like correspond to the drive signal SD that continues from the transmission-process start timing TT0 to the transmission-process end timing TTE being segmented into a number of pieces that corresponds to a number of encoding bits of the transmission wave.

As described above, the transmission-process start timing TT0 repeatedly arrives at a predetermined cycle while the object detection condition being met. A time interval from time TT0 to TT1, a time interval from TT1 to TT2, and a time interval from time TT2 to TTE are substantially equal.

The plurality of segmented drive signals SD1 and the like are continuously outputted in terms of time. That is, an interval period is not provided between the segmented drive signals that are adjacent to each other, among the plurality of segmented drive signals SD1 and the like. Details thereof will be described hereafter. In addition, each of the plurality of segmented drive signals SD1 and the like is encoded based on the frequency modulation mode. For example, in the specific example shown in FIG. 2, a leading drive signal SD1 from time TT0 to TT1 may have a drive frequency characteristic in which the frequency changes in a V-shape with the elapse of time.

Specifically, a drive-frequency change mode of the leading drive signal SD1 is as follows. At time TT0, the drive frequency is an intermediate frequency fc. The intermediate frequency fc is substantially equal to a resonance frequency f0 of the transmitting/receiving unit 2, that is, the transducer 21. The drive frequency changes to increasing after temporarily decreasing from the intermediate frequency fc to a minimum frequency fmin. At time TT1, the drive frequency is a maximum frequency fmax. Here, fmax>f0. A frequency decrease speed from the intermediate frequency fc to the minimum frequency fmin and a frequency increase speed from the minimum frequency fmin to the maximum frequency fmax are substantially equal. A frequency increase time from the minimum frequency fmin to the maximum frequency fmax is longer than a frequency decrease time from the intermediate frequency fc to the minimum frequency fmin. Therefore, although the leading drive signal SD1 temporarily decreases from the intermediate frequency fc to the minimum frequency fmin, in effect, the leading drive signal SD1 has an "upchirp"-like frequency change mode. A code "1" that corresponds to the upchirp-like frequency change mode is attached to the leading drive signal SD1 that is a leading bit, that is, a first bit.

At time TT1, the drive signal SD is switched from the leading drive signal SD1 to an intermediate drive signal SD2. That is, the leading drive signal SD1 and the intermediate drive signal SD2 are continuous in terms of time. In other words, an end time of the leading drive signal SD1 and a start time of the intermediate drive signal SD2 coincide. The intermediate drive signal SD2 from time TT1 to TT2 has a drive frequency characteristic in which the frequency changes in a V-shape with the elapse of time.

The drive-frequency change mode of the intermediate drive signal SD2 is similar to the drive-frequency change mode of the leading drive signal SD1. That is, the changes in drive frequency in the intermediate drive signal SD2 are as follows. At time TT1, the drive frequency is the intermediate frequency fc. The drive frequency changes to increasing after temporarily decreasing from the intermediate frequency fc to the minimum frequency fmin.

At time TT2, the drive frequency is the maximum frequency fmax. The frequency decrease speed from the intermediate frequency fc to the minimum frequency fmin and the frequency increase speed from the minimum frequency fmin to the maximum frequency fmax are substantially equal. The frequency increase time from the minimum frequency fmin to the maximum frequency fmax is longer than the frequency decrease time from the intermediate frequency fc to the minimum frequency fmin.

Therefore, although the intermediate drive signal SD2 temporarily decreases from the intermediate frequency fc to the minimum frequency fmin, in effect, the intermediate drive signal SD2 has the "upchirp"-like frequency change mode. The code "1" that corresponds to the upchirp-like frequency change mode is attached to the intermediate drive signal SD2 that is a second bit.

At time TT2, the drive signal SD is switched from the intermediate drive signal SD2 to a terminal drive signal SD3. That is, the intermediate drive signal SD2 and the terminal drive signal SD3 are continuous in terms of time. The terminal drive signal SD3 from time TT2 to TTE has a drive frequency characteristic in which the frequency changes in an inverted V-shape with the elapse of time.

The drive-frequency change mode of the terminal drive signal SD3 is reverse of the drive-frequency change mode of the leading drive signal SD1. That is, the changes in drive frequency in the terminal drive signal SD3 are as follows. At time TT2, the drive frequency is the intermediate frequency fc. The drive frequency changes to decreasing after temporarily increasing from the intermediate frequency fc to the maximum frequency fmax. At time TTE, the drive frequency is the minimum frequency fmin. Here, fmin<f0.

The frequency increase speed from the intermediate frequency fc to the maximum frequency fmax and the frequency decrease speed from the maximum frequency fmax to the minimum frequency fmin are substantially equal. The frequency decrease time from the maximum frequency fmax to the minimum frequency fmin is longer than the frequency increase time the intermediate frequency fc to the maximum frequency fmax.

Therefore, although the terminal drive signal SD3 temporarily increases from the intermediate frequency fc to the maximum frequency fmax, in effect, the terminal drive signal SD3 has a "downchirp"-like frequency change mode. A code "0" that corresponds to the downchirp-like frequency change mode is attached to the terminal drive signal SD3 that is a third bit.

As shown in FIG. 2, a frequency band in the downchirp-like frequency change mode that corresponds to the code "0" is referred to as a downchirp frequency band fbd. This downchirp frequency band fbd is a frequency range from the maximum frequency fmax to the minimum frequency fmin. In addition, a frequency band in the upchirp-like frequency change mode that corresponds to the code "1" is referred to as an upchirp frequency band fbu. This upchirp frequency band fbu is also a frequency range from the minimum frequency fmin to the maximum frequency fmax. That is, the downchirp frequency band fbd and the upchirp frequency band fbu are set to be substantially identical. In addition, the upchirp frequency band fbu and the downchirp frequency band fbd are each set so as to include the resonance frequency f0.

The transmission circuit 22 transmits a transmission wave that is within the ultrasonic band through the transducer 21 by driving the transducer 21 based on the inputted drive signal SD. As described above, the drive signal SD includes the plurality of segmented drive signals SD1 and the like. Each of the plurality of segmented drive signals SD1 and the like is encoded based on the frequency modulation mode.

Therefore, the segmented transmission waves that respectively correspond to the plurality of segmented drive signals SD1 and the like have the frequency modulation modes that correspond to the modulation modes of the drive frequencies of the segmented drive signals SD1 and the like. That is, the segmented transmission waves are encoded based on the frequency modulation modes of the segmented drive signals SD1 and the like. The segmented transmission wave is a transmission wave that corresponds to the segmented drive signal. That is, the segmented transmission waves correspond to a series of transmission waves that are transmitted during a single transmission process from the transmission-process start timing TT0 to the transmission-process end timing TTE being segmented in correspondence to the segmented drive signals.

In this manner, according to the present embodiment, the drive-signal generating unit 3 generates the leading drive signal SD1 that is the drive signal that corresponds to the leading transmission wave that is included in the plurality of segmented transmission waves, and outputs the leading drive signal SD1 towards the transmitting unit 20A. In addition, the drive-signal generating unit 3 generates the intermediate drive signal SD2 and the terminal drive signal SD3 that are the drive signals that correspond to the subsequent transmission waves that are included in the plurality of segmented transmission waves, and outputs the intermediate drive signal SD2 and the terminal drive signal SD3 towards the transmitting unit 20A.

Then, the transmitting unit 20A transmits the transmission wave that includes the plurality of segmented transmission waves from the start of the transmission process to the end of the transmission process. The plurality of segmented transmission waves are continuously transmitted from the start of the transmission process to the end of the transmission process, and are each encoded based on the waveform pattern. As a result, the transmission wave is encoded so as to have a code sequence of a plurality of bits.

In the present operation example, the series of transmission waves that are transmitted from the transmission-process start timing TT0 to the transmission-process end timing TTE includes the three segmented transmission waves that respectively correspond to the three segmented drive signals SD1 to SD3. The three segmented transmission waves are chirp-encoded so as to respectively correspond to the frequency change modes of the three segmented drive signals SD1 to SD3.

For example, in the specific example shown in FIG. 2, the leading transmission wave that corresponds to the leading drive signal SD1 that is the first bit may be encoded by the code "1" that corresponds to the waveform pattern of the leading drive signal SD1, that is, the upchirp. In addition, the segmented transmission wave that corresponds to the intermediate drive signal SD2 that is the second bit may be encoded by the code "1" that corresponds to the waveform pattern of the intermediate drive signal SD2, that is, the upchirp. Furthermore, the segmented transmission wave that corresponds to the terminal drive signal SD3 that is the third bit may be encoded by the code "0" that corresponds to the waveform pattern of the terminal drive signal SD3, that is, the downchirp.

The transmission wave that corresponds to the drive signal SD shown in FIG. 2 has a three-bit code that is "110". That is, the codes of the first bit, the second bit, and the third bit are respectively "1", "1", and "0". In a similar manner, according to the present embodiment, a three-bit code such as "100", "111", "010", "011", or "001" can be included in the transmission wave. In this manner, as a result of the object detection apparatus 1 according to the present embodiment and the object detection method performed by the object detection apparatus 1, identification accuracy can be improved from that in the past by the transmission wave being encoded by a plurality of bits.

During a predetermined receivable period in the object detection operation, the receiving unit 20B performs a reception operation. In the configuration according to the present embodiment that is the integrated transmission/reception-type, the receivable period is a period between the transmission-process end timing TTE and a next transmission-process start timing TT0 that arrives immediately after the transmission-process end timing TTE, excluding a dead zone that is caused by effects of reverberation and the like. During the receivable period, the transducer 21 that serves as a receiver outputs the element output signal that is the alternating-current voltage signal that is based on the amplitude and the frequency of the reception wave.

The reception circuit 23 generates the reception signal by performing signal processing, such as amplification and analog/digital conversion, on the element output signal. The reception-signal processing unit 4 generates the amplification signal and the frequency signal by performing a process, such as FFT, on the reception signal. The reception-signal processing unit 4 outputs the generated amplification signal and frequency signal to the control unit 5.

As described above, the plurality of segmented drive signals SD1 and the like that are included in the drive signal SD are each frequency-modulated in correspondence to the code. In addition, the frequency of the transmission wave is based on the drive frequency that is the frequency of the drive signal SD. Therefore, the transmission wave has changes in frequency that correspond to changes over time in the drive frequency as a characteristic that corresponds to identifiability. Consequently, when the reception wave is a regular wave, the reception signal should have characteristics that are similar to those of the transmission wave regarding a frequency modulation state.

Therefore, the detecting unit 52 in the control unit 5 determines whether the reception wave is a regular wave based on the frequency signal that is outputted from the reception-signal processing unit 4. Specifically, the reception determining unit 523 performs reception determination regarding the reflected wave by collating the frequency signal that corresponds to the waveform pattern of the reception signal and the reference signal that is stored in the reference signal storage unit 521.

Figure 3:
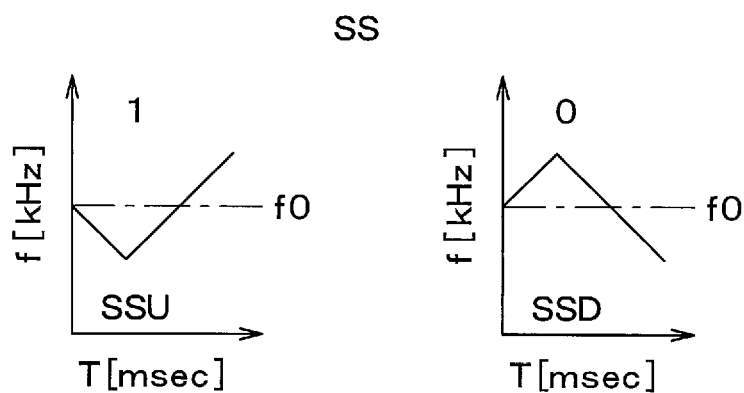
FIG. 3 is a timing chart illustrating an example of a reference signal that is stored in a reference-signal storage unit shown in FIG. 1.

FIG. 3 shows a specific example of a reference signal SS that is stored in the reference-signal storage unit 521. A downchirp reference signal SSD that corresponds to the code "0" has a drive frequency characteristic in which the frequency changes in an inverted V-shape with the elapse of time. A waveform of the downchirp reference signal SSD is formed in correspondence to a waveform of a segmented drive signal that corresponds to the code "0", such as the terminal drive signal SD3 in the specific example shown in FIG. 2. Specifically, the downchirp reference signal SSD has a frequency characteristic in which the frequency decreases further towards a low frequency side than the resonance frequency f0 after temporarily increasing from the resonance frequency f0.

In contrast, an upchirp reference signal SSU that corresponds to the code "1" has a drive frequency characteristic in which the frequency changes in a V-shape with the elapse of time. A waveform of the upchirp reference signal SSU is formed in correspondence to a waveform of a segmented drive signal that corresponds to the code "1", such as the leading drive signal SD1 in the specific example shown in FIG. 2. Specifically, the upchirp reference signal SSU has a frequency characteristic in which the frequency increases further towards a high frequency side than the resonance frequency f0 after temporarily decreasing from the resonance frequency f0.

When the own vehicle and the object B are both stopped, the frequency of the transmission wave and the frequency of the reception wave that is the reflected wave from the object B of the transmission wave substantially coincide. In this case, the waveform of the frequency signal of the reception wave and the waveform of the reference signal substantially coincide on a timing chart of which the vertical axis is frequency f and the horizontal axis is time T.

However, in actuality, in many cases, at least either of the own vehicle and the object B is moving. Typically, at least the own vehicle is moving. Alternatively, the own vehicle and the object B are both moving in movement modes that differ from each other. The movement mode includes speed, acceleration, and direction of movement. The movement mode also includes stopping. When the movement modes differ between the own vehicle and the object B, a frequency shift occurs between the transmission wave and the reception wave.

Figure 4:
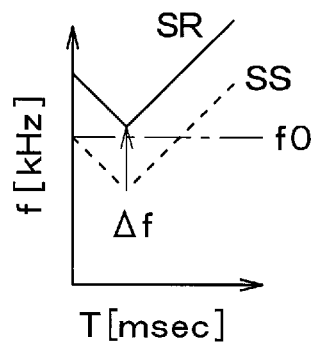
FIG. 4 is a timing chart illustrating an overview of frequency-shift amount detection by a frequency-shift detecting unit shown in FIG. 1.

FIG. 4 conceptually shows such frequency shift. In FIG. 4, a solid line schematically shows the frequency characteristic of a reception signal SR, that is, the above-described frequency signal. In addition, a broken line schematically shows the frequency characteristic of the reference signal SS.

For example, when the object B is approaching the own vehicle, as shown in FIG. 4, the frequency of the reception signal SR may be higher than the frequency of the reference signal SS. In such cases, the frequency shift occurs in such a manner that either of the reception signal SR and the reference signal SS is moved to be offset by $\Delta f$ towards the other. $\Delta f$ is a frequency shift amount. The frequency shift amount $\Delta f$ can be considered to be substantially equal to a Doppler shift amount.

The frequency shift amount $\Delta f$ is shown in expression (1) below. In expression (1), N is a number of samples, fr is the frequency of the reception signal, and R is the frequency of the reference signal SS. The frequency-shift detecting unit 522 calculates the frequency shift amount Δf between the transmission wave and the reflected wave that is based on the relative velocity that accompanies relative movement between the own vehicle and the object B, using expression (1).

$$\Delta f = \frac{1}{N}\sum_{i=1}^{N}(f_{ri} - R_i) = \frac{1}{N}\sum_{i=1}^{N}f_{ri} - \frac{1}{N}\sum_{i=1}^{N}R_i \quad (1)$$

A relative velocity Δv between the object B and the own vehicle is shown in expression (2) below. In expression (2), c is a speed of sound. Hereafter, the relative velocity between the own vehicle and the object B may be simply shortened to "relative velocity".

$$\Delta v = \frac{c\Delta f}{2f_0 + \Delta f} \quad (2)$$

The reception determining unit 523 performs the reception determination regarding the reflected wave based on the frequency signal that corresponds to the waveform pattern of the reception signal SR, the frequency shift amount Δf that is detected by the frequency-shift detecting unit 522, and the reference signal SS. Specifically, the reception determining unit 523 determines whether the reception wave is a regular wave by performing pattern matching between the waveform of the frequency signal and the waveform of the reference signal SS while taking into consideration the detected frequency shift.

According to the present embodiment, the reception determining unit 523 performs pattern matching using a mean squared error MSE. That is, the reception determining unit 523 calculates the mean squared error MSE by expression (3) below.

$$MSE = \frac{1}{N}\sum_{i=1}^{N}(f_{ri} - R_i - \Delta f)^2 \quad (3)$$

In addition, when the mean squared error MSE is less than a predetermined code determination threshold, the reception determining unit 523 determines that a chirp signal that has a code that corresponds to the frequency change mode of the reference signal SS is included in the reception wave. Then, when a predetermined code sequence that is included in the transmission wave, such as "110" above, is also included in the reception wave, the reception determining unit 523 determines that the reception wave is a regular wave. Then, when the reception wave is a regular wave, the detection determining unit 524 detects the object B based on the amplitude signal that is outputted from the reception-signal processing unit 4.

Figure 5:
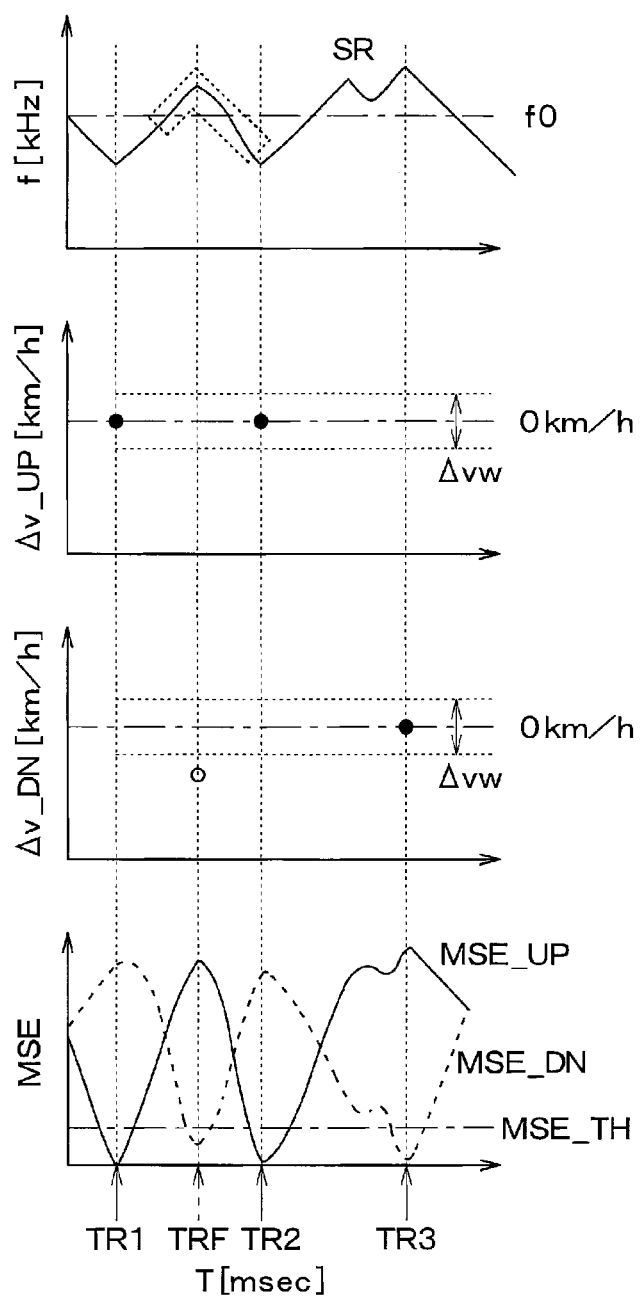
FIG. 5 is a timing chart illustrating an overview of an example of a reception determination process performed by a detecting unit shown in FIG. 1.

FIG. 5 shows an overview of a reception determination process when a reflected wave from the object B of the transmission wave that corresponds to the drive signal SD shown in FIG. 2 is received as a regular wave. In FIG. 5, a topmost timing chart shows the frequency signal that corresponds to the reception signal SR.

Timing charts in middle rows in FIG. 5 show the relative velocity that is calculated by expression (2) above. That is, Δv_UP in the timing chart that is second from the top is a calculation result of the relative velocity Δv when an upchirp reference signal SSU that corresponds to the code "1" is used as the reference signal. Δv_DN in the timing chart that is third from the top is a calculation result of the relative velocity Δv when a downchirp reference signal SSD that corresponds to the code "0" is used as the reference signal SS.

A timing chart that is shown at the bottom in FIG. 5 shows the mean squared error MSE that is calculated by expression (3) above. MSE_UP that is indicated by a solid line is a calculation result of the mean squared error MSE when the upchirp reference signal SSU that corresponds to the code "1" is used as the reference signal SS. MSE_DN that is indicated by a broken line is a calculation result of the mean squared error MSE when the downchirp reference signal SSD that corresponds to the code "0" is used as the reference signal SS. MSE_TH that is indicated by a horizontal single-dot chain line is the code determination threshold. In addition, TR1 and the like that are indicated by arrows on the horizontal axis indicate time when the mean squared error MSE becomes less than the code determination threshold MSE_TH and becomes a local minimum. In particular, the earliest time TR1 that corresponds to the leading drive signal SD1 and the leading transmission wave is also referred to as a "reception time".

As shown in FIG. 2, in the present operation example, the drive signal SD has the leading drive signal SD1 that has the upchirp-like waveform pattern that corresponds to the code "1". In addition, the drive signal SD has the intermediate drive signal SD2 that has the upchirp-like waveform pattern that corresponds to the code "1". Furthermore, the drive signal SD has the terminal drive signal SD3 that has the downchirp-like waveform pattern that corresponds to the code "0". As a result, the code "110" is attached to the transmission wave.

As shown in FIG. 5, at time TR1, the mean squared error MSE_UP that corresponds to the upchirp-like waveform pattern is less than the code determination threshold MSE_TH and is a local minimum. Therefore, a determination is made that the waveform pattern of the first bit that corresponds to time TR1 in the reception wave includes the waveform pattern that corresponds to the code "1". Here, the calculation value Δv_UP of the relative velocity that corresponds to the value of the mean squared error MSE_UP at time TR1 substantially coincides with an actual relative velocity Δv=0 km/h.

In a similar manner, at time TR2 that is subsequent to time TR1, the mean squared error MSE_UP that corresponds to the upchirp-like waveform pattern is less than the code determination threshold MSE_TH and is a local minimum. Here, the speed of sound that is a propagation velocity of the transmission wave and the reflected wave is sufficiently faster compared to the movement speeds of the own vehicle and the object B in the vicinity thereof.

Therefore, at time TR1 and time TR2, the frequency shift amount Δf, that is, the relative velocity Δv can be considered to be substantially unchanged. Therefore, the calculation value Δv_UP of the relative velocity that corresponds to the value of the mean squared error MSE_UP at time TR2 should substantially coincide with the relative velocity Δv that is calculated in the first bit.

In this regard, the calculation value Δv_UP of the relative velocity that corresponds to the value of the mean squared error MSE_UP at time TR2 falls within a range of a determination window Δvw. The determination window Δvw is a relative velocity range of a predetermined width that is centered on the relative velocity Δv=0 km/h that is calculated in the first bit. Therefore, a determination is made that the waveform pattern of the second bit that corresponds to time TR2 in the reception wave includes the waveform pattern that corresponds to the code "1".

In addition, at time TR3 that is subsequent to time TR2, the mean squared error MSE_DN that corresponds to the downchirp-like waveform pattern is less than the code determination threshold MSE_TH and is a local minimum. Here, in a manner similar to that described above, at time TR1 and time TR3, the frequency shift amount Δf, that is, the relative velocity Δv can be considered substantially unchanged. Therefore, the calculation value Δv_DN of the relative velocity that corresponds to the value of the mean squared error MSE_DN at time TR3 should substantially coincide with the relative velocity Δv that is calculated in the first bit.

In this regard, the calculation value Δv_DN of the relative velocity that corresponds to the value of the mean squared error MSE_DN at time TR3 falls within the range of the determination window Δvw. Therefore, a determination is made that the waveform pattern of the third bit that corresponds to time TR3 in the reception wave includes the waveform pattern that corresponds to the code "0".

Here, in a section of the topmost timing chart in FIG. 5 that is surrounded by a dotted line, a frequency change pattern of a waveform that similar to the waveform pattern of the downchirp reference signal SSD is generated. This section is a section between the reflected wave that corresponds to the leading transmission wave and the reflected wave that corresponds to the subsequent transmission wave that is transmitted immediately after the leading transmission wave.

In addition, at time TRF, the mean squared error MSE_DN is less than the code determination threshold MSE_TH and is a local minimum. Therefore, the waveform pattern that corresponds to the code "0" appears to be included immediately after the waveform pattern that corresponds to the leading code "1" in the reception wave, in correspondence to time TRF.

However, this frequency change pattern is attributed to switching between the leading drive signal SD1 and the intermediate drive signal SD2 such as that shown in FIG. 2. That is, this frequency change pattern is not attributed to the segment transmission wave to which the code "0" is intentionally attached based on the segmented drive signal for the downchirp.

Here, the transmitting unit 20A that includes the transducer 21 has the predetermined resonance frequency f0. In this resonance-type transmitting unit 20A, frequency trackability is poor at a drive frequency that is far from the resonance frequency f0. Therefore, the above-described frequency change pattern is generated as a result of the drive frequency increasing towards the maximum frequency fmax until time TT1, discontinuously decreasing to the intermediate frequency fc at time TT1, and subsequently further decreasing towards the minimum frequency fmin.

A frequency change pattern that is generated regardless of coding intentions in this manner is referred to as a "false code". In the present operation example shown in FIG. 2 to FIG. 5, when such a false code is erroneously determined to be the code "0" for the downchirp between the code "1" that corresponds to time TR1 and the code "1" that corresponds to time TR2, identification accuracy decreases. For example, the false code may be generated in a switching portion between two continuous segmented drive signals. Alternatively, for example, the false code may be generated when two reflected waves are continuously received.

In this regard, in the present operation example, a determination is made that the waveform pattern of the first bit that corresponds to time TR1 in the reception wave includes the waveform pattern that corresponds to the code "1". In addition, the relative velocity Δv=0 km/h is calculated based on this determination result of the first bit. Meanwhile, the calculation value Δv=DN of the relative velocity that corresponds to time TRF does not fall within the range of the determination window Δvw. As a result, a determination is made that the waveform pattern of the reception wave that corresponds to time TRF is a false code.

As described in detail above, according to the present embodiment, the reception determination of the first bit is performed based on the frequency signal that corresponds to the waveform pattern of the reception signal SR and the reference signal SS that corresponds to the waveform pattern of the leading drive signal SD1. In addition, the reception determination of the second and subsequent bits and is performed based on the reception determination result of the first bit. That is, relative velocity determination in which the relative velocity Δv that is calculated in the first bit is referenced is combined with pattern matching. As a result, the false code can be favorably differentiated.

Specifically, in the reception determination of the first bit, the frequency shift amount Δf is calculated. In addition, the relative velocity Δv is calculated based on the calculated frequency shift amount Δf. Then, the code determination for the second and subsequent bits is performed based on whether the calculation values of the relative velocities Δv of the second and subsequent bits fall within the determination window Δvw that is the relative velocity range that is set based on the calculation value of the relative velocity Δv of the first bit.

In addition, as described above, the false code may also be generated when a plurality of reflected wave signals are received in an overlapping manner. In this case, as a result of subsequent bits being determined with reference to the leading bit that has high reliability and is not overlapping, an accurate determination can be made. Consequently, as a result of the object detection apparatus 1 according to the present embodiment and the object detection method performed by the object detection apparatus 1, erroneous determination based on a false code can be favorably suppressed, and further, identification accuracy can be improved from that in the past.

According to the present embodiment, the detecting unit 52 performs the reception determination regarding the reflected wave that corresponds to the leading transmission wave based on the reference signal SS that corresponds to the waveform pattern of the leading drive signal SD1. In addition, the detecting unit 52 performs the reception determination regarding the reflected waves that correspond to the subsequent transmission waves based on the reference signals SS that corresponds to the waveform patterns of the subsequent segmented drive signal SD2 and the like.

In this configuration and method, the reception determination regarding the reflected wave that corresponds to the leading transmission wave that is encoded based on the waveform pattern of the leading drive signal SD1 is performed based on the reference signal SS that corresponds to the waveform pattern of the leading drive signal SD1. In addition, the reception determination regarding the reflected wave that corresponds to the subsequent transmission wave that is encoded based on the waveform pattern of the intermediate drive signal SD2 is performed based on the reference signal SS that corresponds to the waveform pattern of the intermediate drive signal SD2.

In a similar manner, the reception determination regarding the reflected wave that corresponds to the subsequent transmission wave that is encoded based on the waveform pattern of the terminal drive signal SD3 is performed based on the reference signal SS that corresponds to the waveform pattern of the terminal drive signal SD3. Consequently, as a result of the object detection apparatus 1 according to the present embodiment and the object detection method performed by the object detection apparatus 1, accuracy of the reception determination can be further improved.

According to the present embodiment, the detecting unit 52 includes the frequency-shift detecting unit 522. The frequency-shift detecting unit 522 detects the frequency shift amount $\Delta f$ between the transmission wave and the reflected wave that is based on the relative velocity between the own vehicle and the object B. In addition, the detecting unit 52 performs the reception determination regarding the reflected wave that corresponds to the subsequent transmission wave based on the frequency shift amount $\Delta f$ that is detected from the reflected wave that corresponds to the leading transmission wave.

Specifically, the frequency-shift detecting unit 522 calculates the frequency shift amount $\Delta f$ based on the reception determination result of the reflected wave that corresponds to the leading transmission wave that is the first bit. In addition, the detecting unit 52 calculates the relative velocity $\Delta v$ based on this frequency shift amount $\Delta f$. Then, the detecting unit 52 performs code determination regarding the second and subsequent bits based on whether the calculation values of the relative velocities $\Delta v$ of the second and subsequent bits fall within the determination window $\Delta vw$ that is set based on the calculation value of the relative velocity $\Delta v$.

In this configuration, the frequency shift amount $\Delta f$ that is based on the relative velocity between the own vehicle and the object B in the vicinity thereof is detected from the reflected wave that corresponds to the leading transmission wave. Then, the reception determination regarding the reflected wave that corresponds to the subsequent transmission wave is performed based on the frequency shift amount $\Delta f$, that is, the relative velocity $\Delta v$ that is detected from the reflected wave that corresponds to the leading transmission wave.

As a result, Doppler shift correction in the reception determination regarding the reflected wave that corresponds to the subsequent transmission wave can be favorably performed using the chirp encoding in the leading transmission wave. Consequently, as a result of the object detection apparatus 1 according to the present embodiment and the object detection method performed by the object detection apparatus 1, accuracy of the reception determination when the own vehicle and the object B in the vicinity thereof are moving relative to each other can be further improved.

According to the present embodiment, at least the leading transmission wave is encoded by frequency modulation. That is, at least the leading transmission wave is chirp-encoded such that the frequency changes with the elapse of time. Specifically, in the specific example shown in FIG. 2, at least the leading transmission wave is encoded by the V-shaped chirp wave. Consequently, accuracy of the reception determination can be further improved. In particular, the detection accuracy regarding the frequency shift amount $\Delta f$, that is, the relative velocity $\Delta v$ is improved. In addition, accuracy of detection or identification of the reception time TR1 is improved.

Second Embodiment

A second embodiment will be described below with reference to FIG. 6 to FIG. 9. Here, in the description according to the second embodiment below, sections that differ from those according to the first embodiment are mainly described. In addition, sections according to the first embodiment and the second embodiment that are identical or equivalent to each other are given the same reference numbers.

Therefore, in the description according to the second embodiment below, the description according to the first embodiment may be applied as appropriate regarding constituent elements that have the same reference numbers as those according to the first embodiment, unless technical inconsistencies or special additional descriptions are present. This similarly applies to a third embodiment described hereafter.

Figure 6:
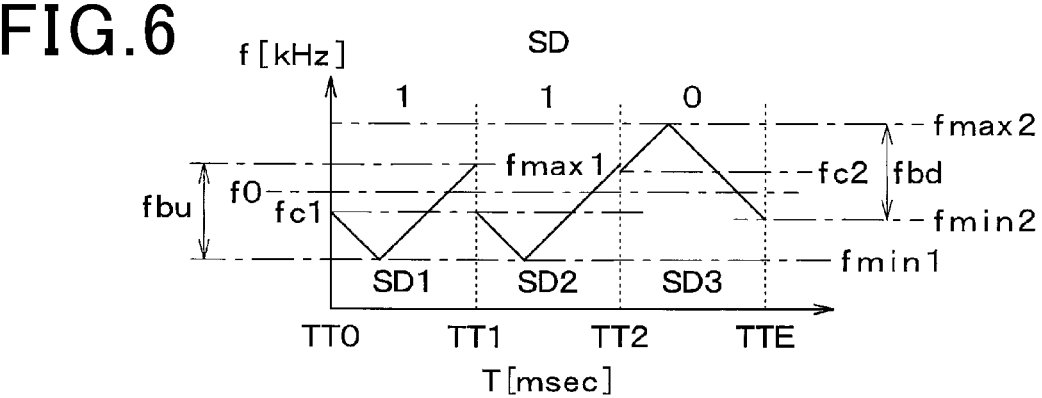
FIG. 6 is a timing chart illustrating an example of a drive signal according to a second embodiment.

FIG. 6 shows an example of the drive signal SD according to the present embodiment. According to the present embodiment, the leading drive signal SD1 is formed such that the frequency changes with the elapse of time in the upchirp frequency band fbu that is formed by a first minimum frequency fmin1 and a first maximum frequency fmax1. The upchirp frequency band fbu corresponds to a "first frequency band.

Specifically, the drive-frequency change mode of the leading drive signal SD1 is as follows. At time TT0, the drive frequency is a first intermediate frequency fc1. Here, fc1<f0. The drive frequency changes to increasing after temporarily decreasing from the first intermediate frequency fc1 to the first minimum frequency fmin1. At time TT1, the drive frequency is the first maximum frequency fmax1. Here, fmax1>f0.

The frequency decrease speed from the first intermediate frequency fc1 to the first minimum frequency fmin1 and the frequency increase speed from the first minimum frequency fmin1 to the first maximum frequency fmax1 are substantially equal. The frequency increase time from the first minimum frequency fmin1 to the first maximum frequency fmax1 is longer than the frequency decrease time from the first intermediate frequency fc1 to the first minimum frequency fmin1.

Therefore, although the leading drive signal SD1 temporarily decreases from the first intermediate frequency fc1 to the first minimum frequency fmin1, in effect, the leading drive signal SD1 has the "upchirp"-like frequency change mode. The code "1" that corresponds to the upchirp-like frequency change mode is attached to the leading drive signal SD1 that is the first bit.

The drive-frequency change mode of the intermediate drive signal SD2 is similar to the drive-frequency change mode of the leading drive signal SD1. That is, the intermediate drive signal SD2 is also formed such that the frequency changes with the elapse of time in the upchirp frequency band fbu. The code "1" that corresponds to the upchirp-like frequency change mode is attached to the intermediate drive signal SD2 that is the second bit.

Meanwhile, the terminal drive signal SD3 is formed such that the frequency changes with the elapse of time in the downchirp frequency band fbd that is formed by a second minimum frequency fmin2 and a second maximum frequency fmax2. The downchirp frequency band fbd corresponds to a "second frequency band."

The changes in drive frequency in the terminal drive signal SD3 are as follows. At time TT2, the drive frequency is a second intermediate frequency fc2. Here, fc2>f0. The drive frequency changes to decreasing after temporarily increasing from the second intermediate frequency fc2 to the second maximum frequency fmax2. At time TTE, the drive frequency is the second minimum frequency fmin2. Here, fmin2<f0. The frequency increase speed from the second intermediate frequency fc2 to the second maximum frequency fmax2 and the frequency decrease speed from the second maximum frequency fmax2 to the second minimum frequency fmin2 are substantially equal. The frequency decrease time from the second maximum frequency fmax2 to the second minimum frequency fmin2 is longer than the frequency increase time from the second intermediate frequency fc2 to the second maximum frequency fmax2.

Therefore, although the terminal drive signal SD3 temporarily increases from the second intermediate frequency fc2 to the second maximum frequency fmax2, in effect, the terminal drive signal SD3 has the "downchirp"-like frequency change mode. The code "0" that corresponds to the downchirp-like frequency change mode is attached to the terminal drive signal SD3 that is the third bit.

According to the above-described first embodiment, the downchirp frequency band fbd and the upchirp frequency band fbu are set so as to coincide, that is, overlap each other overall. In contrast, according to the present embodiment, the downchirp frequency band fbd and the upchirp frequency band fbu are set so as to partially overlap each other.

Specifically, the downchirp frequency band fbd and the upchirp frequency band fbu are formed such that the second minimum frequency fmin2 is a higher frequency than the first minimum frequency fmin1. In addition, the downchirp frequency band fbd and the upchirp frequency band fbu are formed such that the second maximum frequency fmax2 is a higher frequency than the first maximum frequency fmax1.

In this manner, the upchirp frequency band fbu according to the present embodiment corresponds to the upchirp frequency band fbu according to the above-described first embodiment that is shifted or offset towards the low frequency side. A shift amount or an offset amount corresponds to a difference between the first intermediate frequency fc1 and the resonance frequency f0.

In a similar manner, the downchirp frequency band fbd according to the present embodiment corresponds to the downchirp frequency band fbd according to the above-described first embodiment that is shifted or offset towards the high frequency side. A shift amount or an offset amount corresponds to a difference between the second intermediate frequency fc2 and the resonance frequency f0. In addition, the downchirp frequency band fbd and the upchirp frequency band fbu are set so as to have substantially identical band widths. That is, fmax1−fmin1≈fmax2−fmin2. Furthermore, the upchirp frequency band fbu and the downchirp frequency band fbd are set so as to include the resonance frequency f0.

Here, the transducer 21 that is a resonance-type ultrasonic microphone has characteristics similar to a band-pass filter. That is, the frequency band that can be favorably transmitted and received by the transmitting unit 20A is essentially limited to a width of ±several % with the resonance frequency f0 at the center. At a drive frequency that is far from the resonance frequency, trackability of the transmitting unit 20A is poor.

Therefore, a predetermined transmission/reception frequency band is set for the transmitting unit 20A. This transmission/reception frequency band is a range in which S=0 to Sb [dB], when output or sensitivity is S and S=0 [dB] at the resonance frequency f0. That is, the transmission/reception frequency band that is a frequency range that can be favorably transmitted and received by the transmitting/receiving unit 2 is a band between an upper-limit frequency fu and a lower-limit frequency fd in which S=0 to Sb [dB]. For example, Sb may be typically −3 [dB]. The sensitivity is the sensitivity when the transducer 21 is used as the receiver. Here, the transmission/reception frequency band such as this may also be referred to as a "resonance band", a −3 dB band," or a "3 dB band".

Therefore, according to the present embodiment, the downchirp frequency band fbd and the upchirp frequency band fbu are set so as to fall within the transmission/reception frequency band between the upper-limit frequency fu and the lower-limit frequency fd. Specifically, the first minimum frequency fmin1 is set to coincide with the lower-limit frequency fd. In addition, the second maximum frequency fmax2 is set to coincide with the upper-limit frequency fu.

Figure 7:
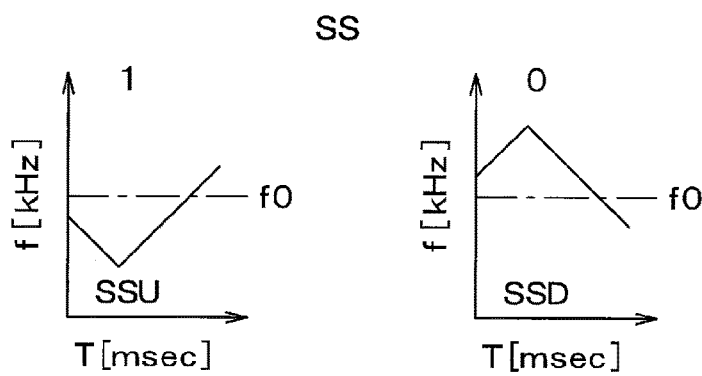
FIG. 7 is a timing chart illustrating an example of a reference signal according to the second embodiment.

FIG. 7 shows an specific example of the reference signal SS that is stored in the reference-signal storage unit 521. The upchirp reference signal SSU that corresponds to the code "1" has a drive frequency characteristic in which the frequency changes in a V-shape with the elapse of time. The waveform of the upchirp reference signal SSU is formed in correspondence to the waveform of a segmented drive signal that corresponds to the code "1", such as the leading drive signal SD1 in the specific example shown in FIG. 6.

Specifically, the upchirp reference signal SSU has a frequency characteristic in which the frequency increases further towards the high frequency side than the resonance frequency f0 after temporarily decreasing from a frequency that is slightly towards the low frequency side than the resonance frequency f0. That is, the upchirp reference signal SSU according to the present embodiment corresponds to the upchirp reference signal SSU according to the above-described first embodiment that is shifted or offset towards the low frequency side. A shift amount or an offset amount corresponds to a difference between the first intermediate frequency fc1 and the resonance frequency f0.

In contrast, the downchirp reference signal SSD that corresponds to the code "0" has a drive frequency characteristic in which the frequency changes in an inverted V-shape with the elapse of time. The waveform of the downchirp reference signal SSD is formed in correspondence to the waveform of a segmented drive signal that corresponds to the code "0", such as the terminal drive signal SD3 in the specific example shown in FIG. 6.

Specifically, the downchirp reference signal SSD has a frequency characteristic in which the frequency decreases further towards a low frequency side than the resonance frequency f0 after temporarily increasing from a frequency that is slightly towards the high frequency side than the resonance frequency f0. That is, the downchirp reference signal SSD according to the present embodiment corresponds to the downchirp reference signal SSU according to the above-described first embodiment that is shifted or offset towards the high frequency side. A shift amount or an offset amount corresponds to a difference between the second intermediate frequency fc2 and the resonance frequency f0.

Figure 8:
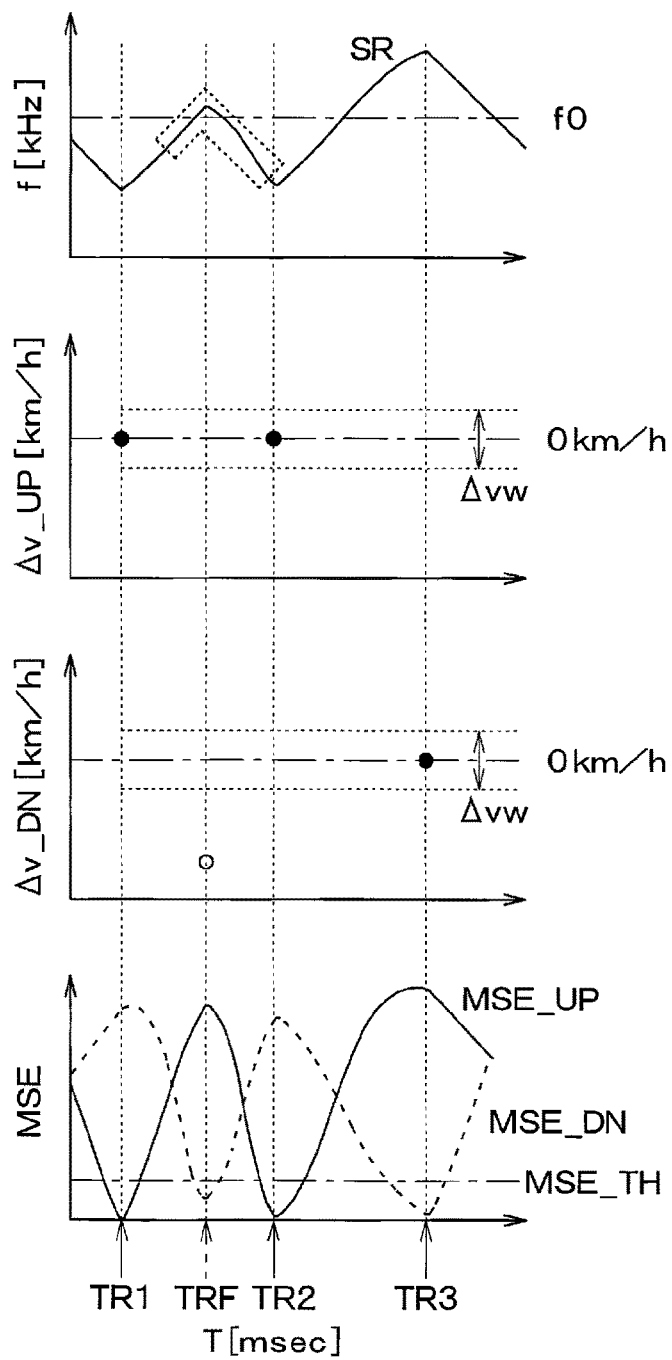
FIG. 8 is a timing chart illustrating an overview of an example of a reception determination process according to the second embodiment.
Figure 9:
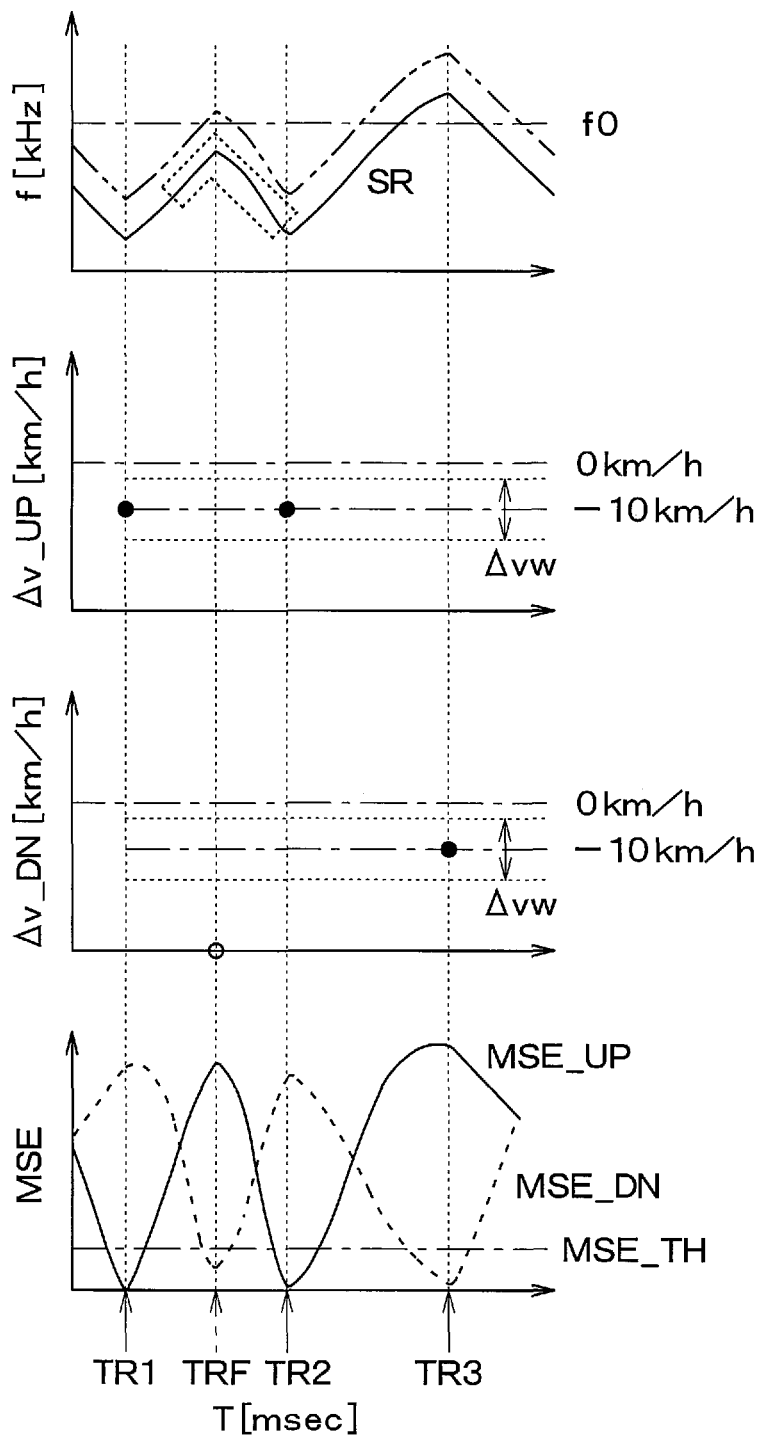
FIG. 9 is a timing chart illustrating an overview of another example of the reception determination process according to the second embodiment.

FIG. 8 and FIG. 9 show an overview of the reception determination process when a reflected wave from the object B of the transmission wave that corresponds to the drive signal SD shown in FIG. 6 is received as a regular wave. That is, timing charts shown in FIG. 8 and FIG. 9 correspond to the timing charts shown in FIG. 5. In addition, in the specific example shown in FIG. 8, the actual relative velocity is 0 km/h. Meanwhile, in the specific example shown in FIG. 9, the actual relative velocity is −10 km/h. That is, in the specific example shown in FIG. 9, the object B is relatively moving away from the own vehicle at a speed of 10 km/h. In a topmost timing chart in FIG. 9, a double-dot chain line indicates the frequency characteristic of the reception signal SR in the specific example shown in FIG. 8, that is, when the relative velocity is 0 km/h. That is, a difference between a solid line and the double-dot chain line in FIG. 9 corresponds to the frequency shift amount Δf.

As shown in sections of the topmost timing charts in FIG. 8 and FIG. 9 that are surrounded by dotted lines, a false-code-like waveform pattern that is similar to the waveform pattern of the downchirp reference signal SSD may be generated in the reception signal SR. In the present specific examples, the false-code-like waveform is generated in a section between the reflected wave that corresponds to the leading transmission wave and the reflected wave that corresponds to the subsequent transmission wave that is transmitted immediately after the leading transmission wave.

In this regard, according to the present embodiment, an offset is provided between the upchirp frequency band fbu and the downchirp frequency band fbd. That is, a shift direction from the resonance frequency f0 of a center frequency of the upchirp frequency band fbu and a shift direction from the resonance frequency f0 of a center frequency of the downchirp frequency band fbd are opposite directions. In a similar manner, a shift direction from the resonance frequency f0 in the upchirp reference signal SSU and a shift direction from the resonance frequency f0 in the downchirp reference signal SSD are opposite directions.

Therefore, consistency between the frequency shift amount Δf or the calculation value of the relative velocity Δv that corresponds to the above-described false-code-like waveform and the frequency shift amount Δf or the calculation value of the relative velocity Δv that corresponds to another section of the reflected wave decreases. That is, as shown in FIG. 8 and FIG. 9, the calculation value Δv_DN of the relative velocity that corresponds to time TRF does not fall within the range of the determination window Δvw that is centered on the relative velocity Δv that is calculated in the first bit. In particular, according to the present embodiment, the calculation value Δv_DN of the relative velocity that corresponds to time TRF is further away from the range of the determination window Δvw than that according to the above-described first embodiment.

In this manner, according to the present embodiment, the calculation value of the relative velocity Δv that corresponds to the false code can be further away from the calculation value of the relative velocity Δv that is calculated in the first bit. Therefore, differentiation of the false code by relative velocity determination with reference to the first bit can be more favorably performed. Consequently, accuracy of the reception determination can be further improved.

According to the present embodiment, the upchirp frequency band fbu and the downchirp frequency band fbd are set so as to include the resonance frequency f0. Consequently, sound pressure of the transmission wave and reception sensitivity of the reflected wave are improved.

According to the preset embodiment, the upchirp frequency band fbu and the downchirp frequency band fbd are set such that the second minimum frequency fmin2 is a higher frequency than the first minimum frequency fmin1. In addition, the upchirp frequency band fbu and the downchirp frequency band fbd are set such that the second maximum frequency fmax2 is a higher frequency than the first maximum frequency fmax1. Consequently, the offset between the frequency bands can be favorably set.

According to the present embodiment as well, at least the leading transmission wave is encoded by frequency modulation. That is, at least the leading transmission wave is chirp-encoded such that the frequency changes with the elapse of time. Specifically, in the specific example shown in FIG. 6, at least the leading transmission wave is encoded by a V-shaped chirp wave. Consequently, accuracy of the reception determination can be further improved.

Third Embodiment

A third embodiment will be described below with reference to FIG. 10 and FIG. 11.

According to the present embodiment, an initial upchirp reference signal SSU0 and an initial downchirp reference signal SSD0 are used as the reference signal SS until the calculation of the frequency shift amount Δf or the relative velocity Δv of the first bit. Here, in the specific example shown in FIG. 10, the drive signal SD is similar to that according to the above-described second embodiment shown in FIG. 6.

In addition, the initial upchirp reference signal SSU0 and the initial downchirp reference signal SSD0 are similar to the upchirp reference signal SSU and the downchirp reference signal SSD according to the above-described second embodiment shown in FIG. 7.

After the frequency shift amount Δf or the relative velocity Δv of the first bit is calculated, a correction upchirp reference signal SSU1 and a correction downchirp reference signal SSD1 are used as the reference signal SS. The correction upchirp reference signal SSU1 is the initial upchirp reference signal SSU0 that is corrected based on the calculation result of the frequency shift amount Δf or the relative velocity Δv of the first bit. The correction downchirp reference signal SSD1 is the initial downchirp reference signal SSD0 that is corrected based on the calculation result of the frequency shift amount Δf or the relative velocity Δv of the first bit.

Figure 10:
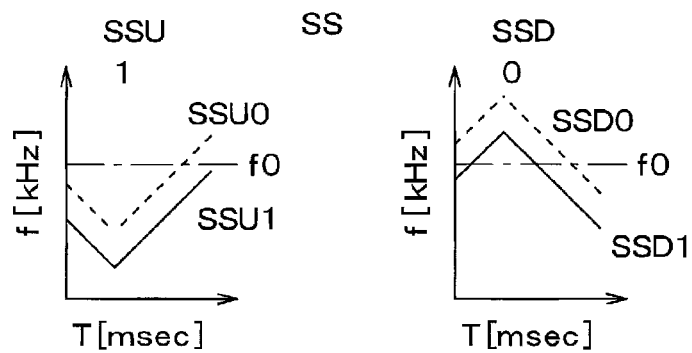
FIG. 10 is a timing chart illustrating an example of a reference signal according to a third embodiment.
Figure 11:
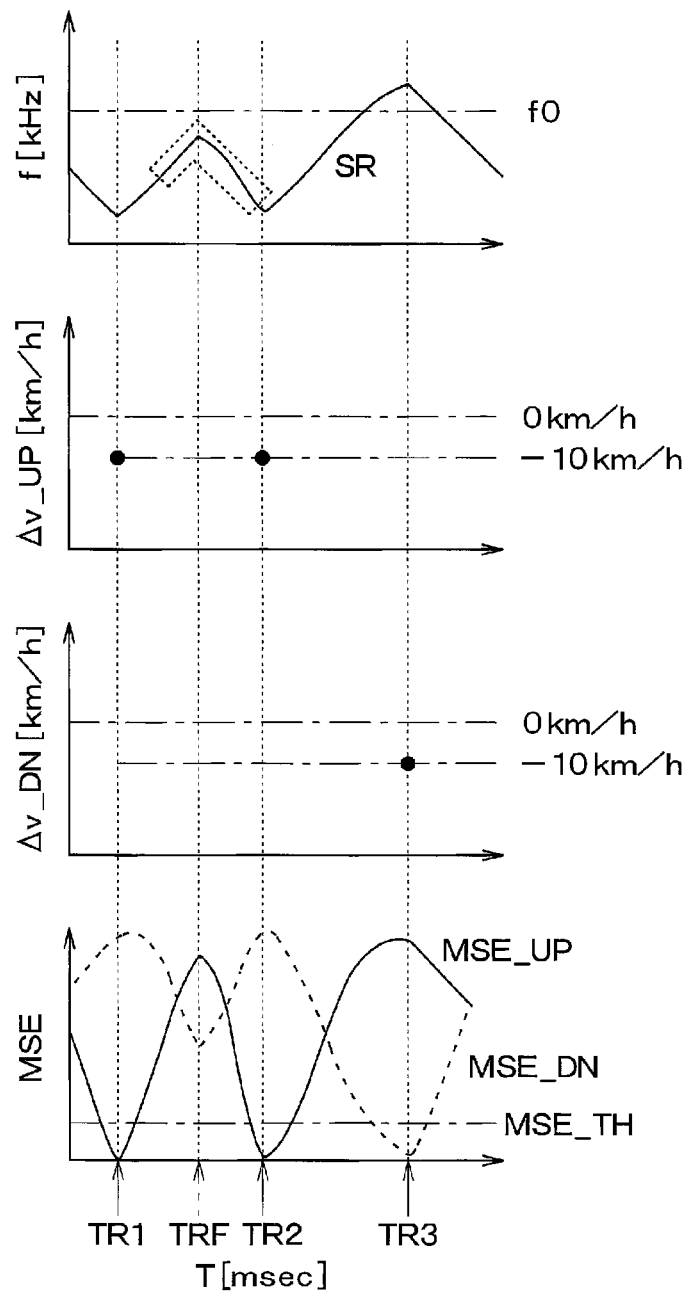
FIG. 11 is a timing chart illustrating an overview of an example of a reception determination process according to the third embodiment.

In the specific examples shown in FIG. 10 and FIG. 11, the actual relative velocity is −10 km/h. That is, in the specific examples shown in FIG. 10 and FIG. 11, the object B is relatively moving away from the own vehicle at a speed of 10 km/h.

As shown in FIG. 11, at time TR1, the mean squared error MSE_DN that corresponds to the upchirp-like waveform pattern is less than the code determination threshold MSE_TH and is a local minimum. Therefore, a determination is made that the waveform pattern of the first bit that corresponds to time TR1 in the reception wave includes the waveform pattern that corresponds to the code "1". In addition, the frequency shift amount Δf and the relative velocity Δv of the first bit are calculated.

Next, according to the present embodiment, the reference signal SS is corrected based on the frequency shift amount Δf or the calculation value of the relative velocity Δv of the first bit. In the mean squared error MSE_DN that is calculated using the correction upchirp reference signal SSU1 and the correction downchirp reference signal SSD1 that are the reference signal SS after correction, the local minimum at time TRF is not less than the code determination threshold MSE_TH. That is, the false code and the reference signal SS do not coincide. Therefore, a code that corresponds to time TRF is not recognized.

In this manner, according to the present embodiment, erroneous determination due to a false code is more favorably suppressed. Consequently, accuracy of the reception determination can be further improved. In addition, the relative velocity determination using the determination window Δvw that is set based on the calculation value of the relative velocity Δv is unnecessary. That is, according to the present embodiment, instead of the relative velocity determination with reference to the first bit according to the above-described first embodiment and the like, correction of the reference signal SS based on the reception determination result of the first bit is performed. Consequently, processing load can be favorably reduced.

Fourth Embodiment

A fourth embodiment will be described below with reference to FIG. 12 and FIG. 13.

Figure 12:
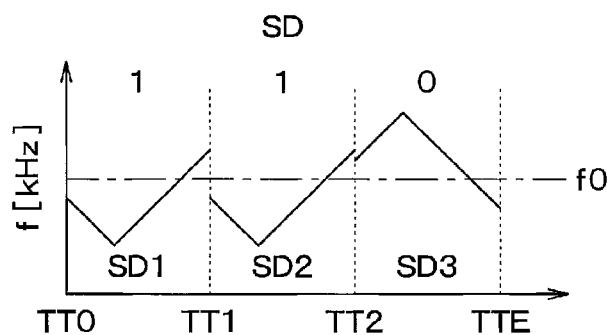
FIG. 12 is a timing chart illustrating an example of a drive signal and a reference signal according to a fourth embodiment.
Figure 12:
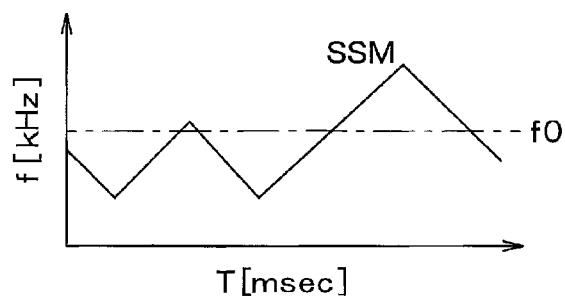

In FIG. 12, an upper row shows an example of the drive signal SD and a lower row shows an example of a composite reference signal SSM that is a reference signal that corresponds to the drive signal SD.

The drive signal SD shown in FIG. 12 is similar to the drive signal SD shown in FIG. 6. FIG. 13 shows an overview of the reception determination process when a reflected wave from the object B of the transmission wave that corresponds to the drive signal SD shown in FIG. 12 is received as a regular wave. In addition, in the specific example shown in FIG. 13, the actual relative velocity is −10 km/h. That is, in the specific example shown in FIG. 13, the object B is relatively moving away from the own vehicle at a speed of 10 km/h.

According to the present embodiment, the detecting unit 52 performs the reception determination regarding the reflected wave based on the composite reference signal SSM. The composite reference signal SSM is that in which the reference signals that respectively correspond to the segmented drive signals SD1 and the like are combined. The composite reference signal SSM may be stored in the reference signal storage unit 521. Alternatively, a process in which the reference signals that respectively correspond to the segmented drive signals SD1 and the like are read from the reference signal storage unit 521 and combined may be performed by the frequency-shift detecting unit 522.

In the specific example shown in FIG. 12, the composite reference signal SSM is that in which the upchirp reference signal SSU of the first bit, the upchirp reference signal SSU of the second bit, and the downchirp reference signal SSD of the third bit are combined. The upchirp reference signal SSU of the first bit is identical to that shown in FIG. 7 and corresponds to the leading drive signal SD1. The upchirp reference signal SSU of the second bit is identical to that shown in FIG. 7 and corresponds to the intermediate drive signal SD2. The downchirp reference signal SSD of the third bit is identical to that shown in FIG. 7 and corresponds to the terminal drive signal SD3.

From the transmission-process start timing TT0 to the transmission-process end timing TTE, the transmission wave that include the plurality of segmented transmission waves that are respectively encoded based on the waveform patterns of the segmented drive signals SD1 and the like is transmitted. The plurality of segmented transmission waves include the leading transmission wave that is encoded based on the leading drive signal SD1.

In addition, the plurality of segmented transmission waves include the subsequent transmission waves that are encoded based on the waveform patterns of the subsequent segmented drive signals SD2 and the like, and transmitted after the leading transmission wave. Therefore, when a reflected wave that is generated by the transmission wave that includes the plurality of segmented transmission waves being reflected by the object B is received by the receiving unit 20B as the reception wave, the reception wave includes the reflected wave that corresponds to the leading wave and the reflected waves that correspond to the subsequent transmission waves.

Here, according to the present embodiment, the composite reference signal SSM that reflects the waveform pattern of the overall transmission signal is used in the reception determination regarding the reflected wave. That is, the reception determination is performed based on whether the mean squared error MSE that is calculated using the composite reference signal SSM is less than the code determination threshold MSE_TH and is a local minimum.

Figure 13:
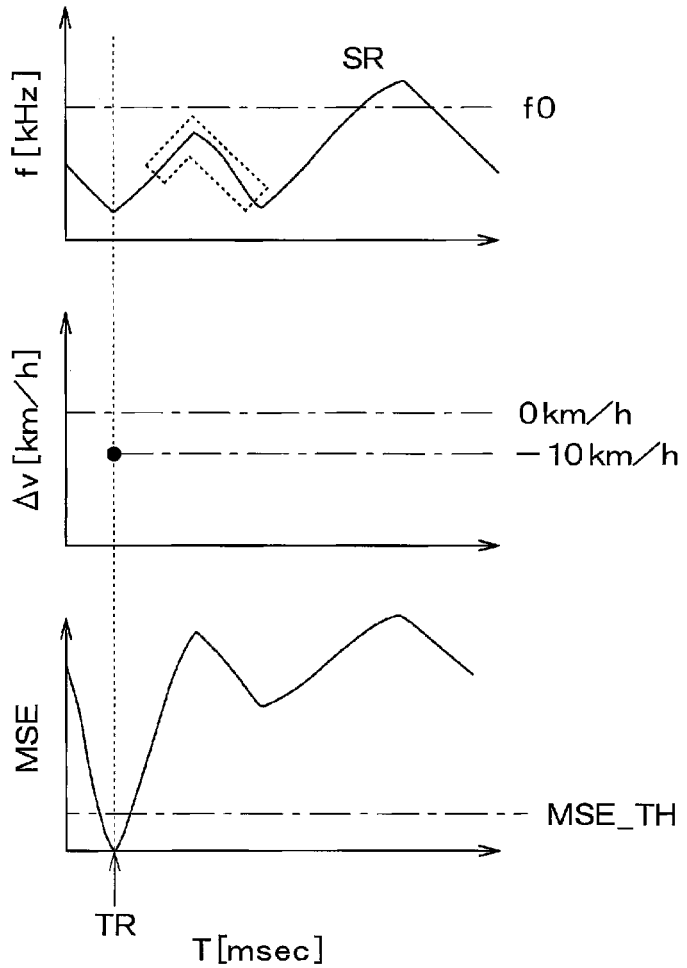
FIG. 13 is a timing chart illustrating an overview of an example of a reception determination process according to the fourth embodiment.

Time TR in a timing chart that is shown at the bottom in FIG. 13 is an earliest time at which the mean squared error MSE becomes less than the code determination threshold MSE_TH and becomes a local minimum. This time TR is also referred to as the "reception time".

According to the present embodiment, accuracy of the reception determination can be further improved through use of the composite reference signal SSM that reflects the waveform pattern of the overall transmission wave. Alternatively, calculation load can be reduced as much as possible by the relative velocity being calculated for only the portion that corresponds to the leading bit in the composite reference signal SSM, and a pattern matching process being performed by applying the relative velocity to the overall composite reference signal SSM.

Fifth Embodiment

Figure 14:
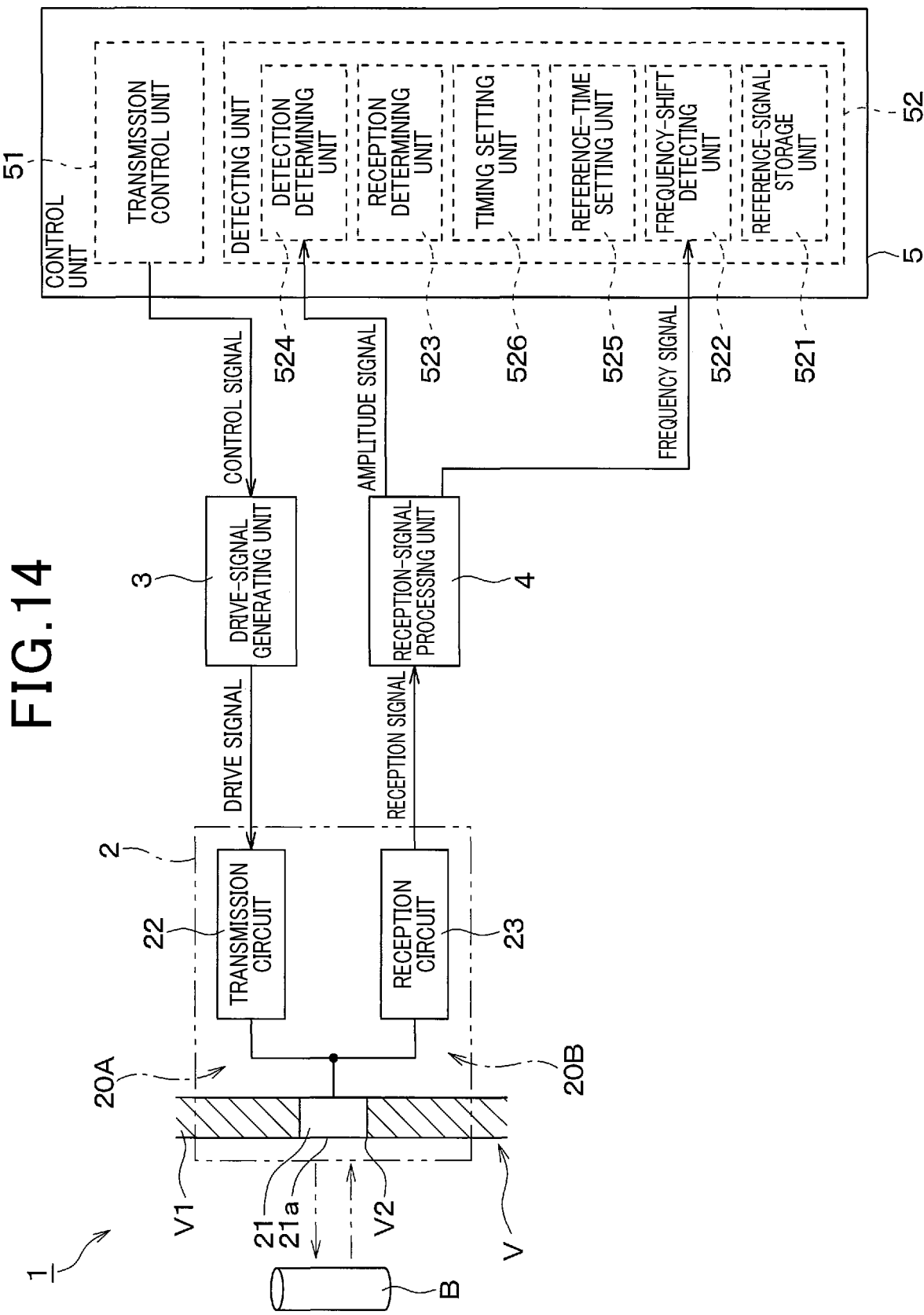
FIG. 14 is a block diagram illustrating an overall configuration of an object detection apparatus according to a fifth embodiment.

A fifth embodiment will be described below with reference to FIG. 14 to FIG. 16. As shown in FIG. 14, the detecting unit 52 includes the reference-signal storage unit 521, the frequency-shift detecting unit 522, the reception determining unit 523, the detection determining unit 524, a reference-time setting unit 525, and a timing setting unit 526.

Figure 15:
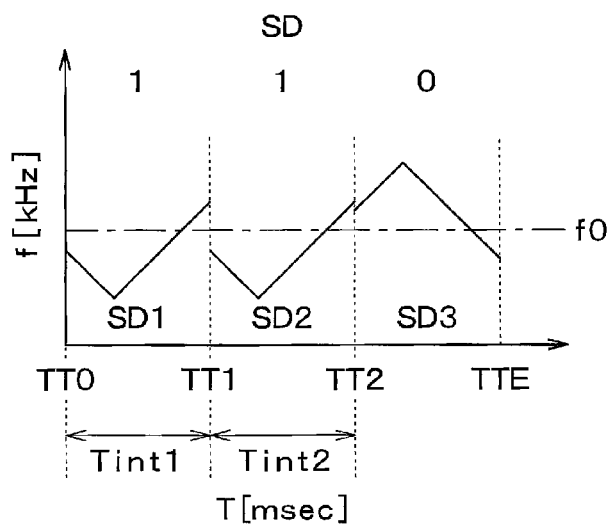
FIG. 15 is a timing chart illustrating a frequency characteristic in an example of a drive signal that is outputted from a drive-signal generating unit shown in FIG. 14.

FIG. 15 shows an example of the drive signal SD according to the present embodiment. The drive signal SD shown in FIG. 15 is similar to the drive signal SD shown in FIG. 6. FIG. 16 shows an overview of the reception determination process when a reflected wave from the object B of the transmission wave that corresponds to the drive signal SD shown in FIG. 15 is received as a regular wave.

The reference-time setting unit 525 sets a reference time TS1 based on the reception determination result of the reflected wave that corresponds to the leading transmission wave. The reference time TS1 is a time at which a degree of coincidence between the frequency signal that is extracted from the reception signal that corresponds to the leading transmission wave and the reference signal is equal to or greater than a predetermined value and is a local maximum. The reference time TS1 is also referred to as the "reception time."

Figure 16:
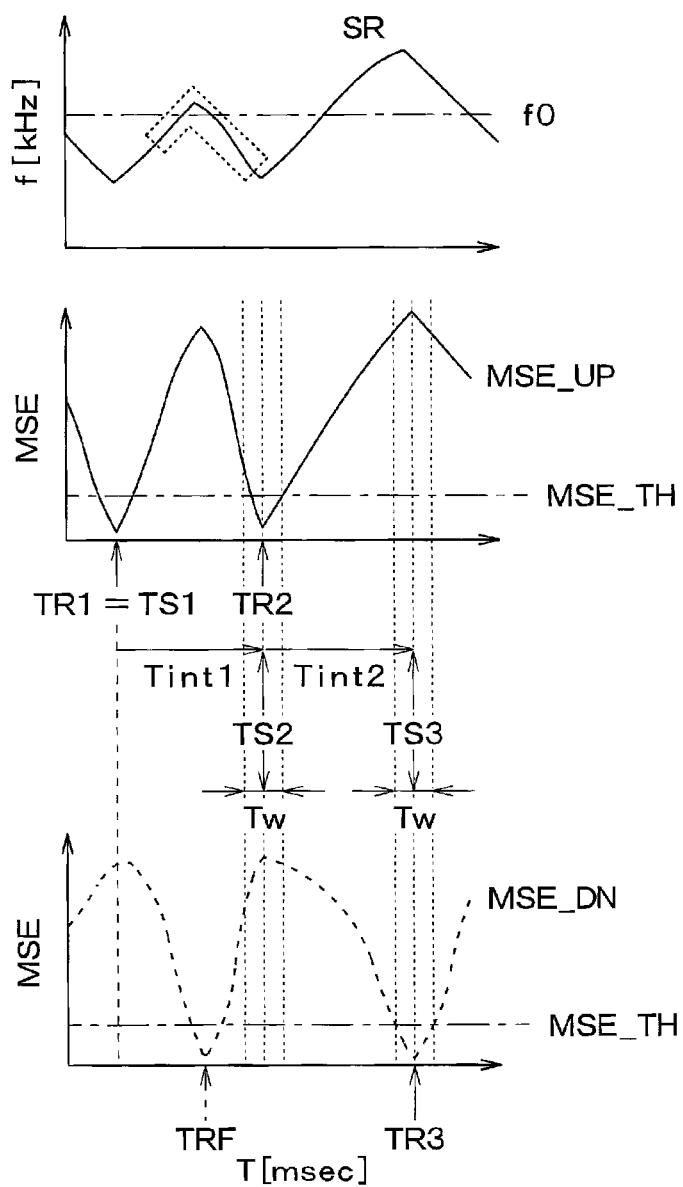
FIG. 16 is a timing chart illustrating an overview of an example of a reception determination process by a detecting unit shown in FIG. 14.
Figure 17:
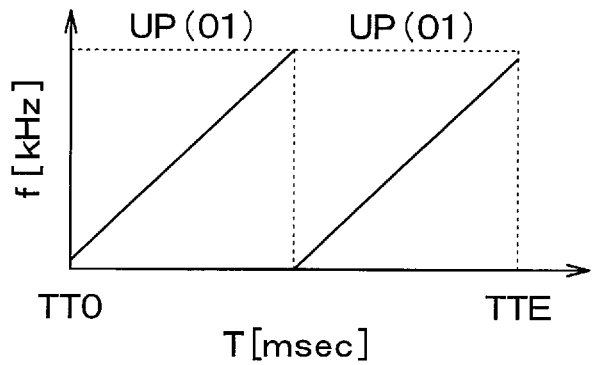
FIG. 17 is a timing chart illustrating the frequency characteristic in another example of the drive signal that is outputted from the drive-signal generating unit shown in FIG. 1 and FIG. 14.
Figure 18:
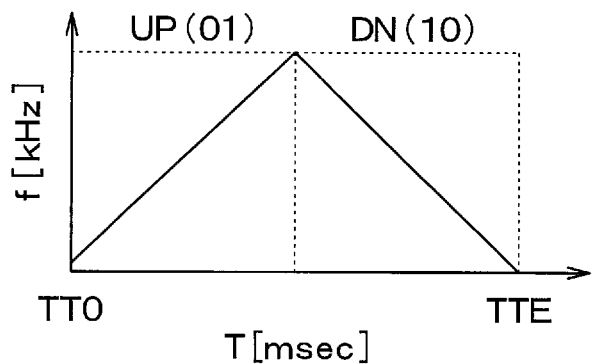
FIG. 18 is a timing chart illustrating the frequency characteristic in another example of the drive signal that is outputted from the drive-signal generating unit shown in FIG. 1 and FIG. 14.
Figure 19:
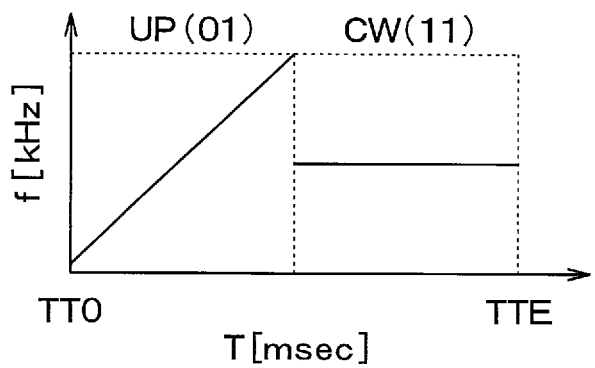
FIG. 19 is a timing chart illustrating the frequency characteristic in another example of the drive signal that is outputted from the drive-signal generating unit shown in FIG. 1 and FIG. 14.
Figure 20:
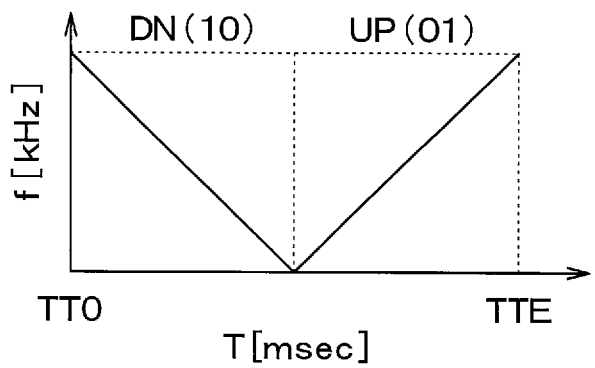
FIG. 20 is a timing chart illustrating the frequency characteristic in another example of the drive signal that is outputted from the drive-signal generating unit shown in FIG. 1 and FIG. 14.
Figure 21:
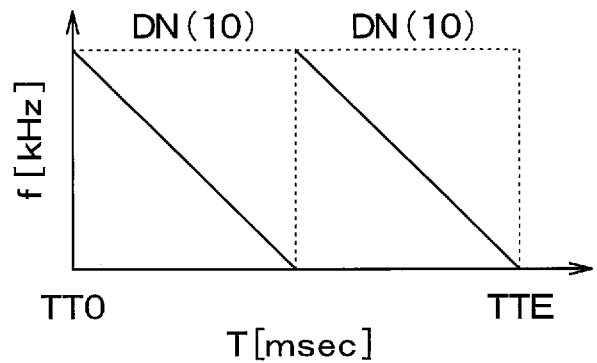
FIG. 21 is a timing chart illustrating the frequency characteristic in another example of the drive signal that is outputted from the drive-signal generating unit shown in FIG. 1 and FIG. 14.
Figure 22:
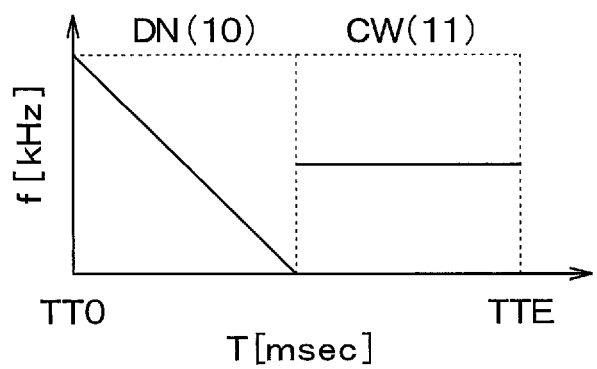
FIG. 22 is a timing chart illustrating the frequency characteristic in another example of the drive signal that is outputted from the drive-signal generating unit shown in FIG. 1 and FIG. 14.

In the specific example shown in FIG. 16, the reference-time setting unit 525 sets the earliest time TR1 among times at which the mean squared error MSE is less than the code determination threshold MSE_TH and is a local minimum as the reference time TS1. As described hereafter, the local minimum of the mean squared error MSE corresponds to a local maximum of a coincidence level M, that is, the degree of coincidence between the frequency signal and the reference signal.

The timing setting unit 526 sets a determination timing TS2 and the like of the subsequent transmission waves with reference to the reference time TS1 that is set by the reference-time setting unit 525. Specifically, the timing setting unit 526 sets the determination timings TS2, TS3, . . . based on the reference timing TS1 and output intervals of the segmented drive signals SD1 and the like.

In the specific examples shown in FIG. 15 and FIG. 16, the timing setting unit 526 sets a timing that is a predetermined time Tint1 after the reference time TS1 as the determination timing TS2. Tint1 is a transmission interval, that is, a time interval between time TT0 to TT1. In addition, the timing setting unit 526 sets a timing that is a predetermined time Tint2 after the determination timing TS2 as the determination timing TS3. Tint2 is a transmission interval, that is, a time interval between time TT1 to TT2.

The reception determining unit 523 performs the reception determination regarding the reflected waves that correspond to the subsequent transmission waves at the determination timings set by the timing setting unit 526. According to the present embodiment, the reception determining unit 523 performs determination regarding whether the mean squared error MSE is less than the code determination value MSE_TH within a determination time window Tw that is centered on the determination time TS2. In addition, the reception determining unit 523 performs determination regarding whether the mean squared error MSE is less than the code determination value MSE_TH within the determination time window Tw that is centered on the determination time TS3.

According to the present embodiment, at time TR2 within the determination time window Tw centered on the determination timing TS2, the mean squared error MSE_UP that corresponds to the upchirp-like waveform pattern is less than the code determination threshold MSE_TH and is the local minimum. As a result, a determination is made that the waveform pattern of the second bit that corresponds to time TR2 includes the waveform pattern that corresponds to the code "1".

In a similar manner, at time TR3 within the determination time window Tw centered on the determination timing TS3, the mean squared error MSE_DN that corresponds to the downchirp-like waveform pattern is less than the code determination threshold MSE_TH and is the local minimum. As a result, a determination is made that the waveform pattern of the third bit that corresponds to time TR3 includes the waveform pattern that corresponds to the code "0".

Meanwhile, at time TRF between the reference time TS1 and the determination timing TS2, the mean squared error MSE_DN that corresponds to the downchirp-like waveform pattern is less than the code determination threshold MSE_TH and is the local minimum. However, a determination timing and a determination time window that correspond to time TRF are not set. Therefore, code determination is not performed regarding the false-code-like waveform such as that shown in the section of the topmost timing chart in FIG. 16 that is surrounded by a dotted line.

In this manner, according to the present embodiment, the reception determination regarding the reflected waves that correspond to the subsequent transmission waves is performed at determination timings that are set with reference to the reference time TS1 that is set based on the reception determination result of the reflected wave that corresponds to the leading transmission wave. That is, the leading transmission wave provides a synchronization function in the reception determination regarding the reflected waves that correspond to the subsequent transmission waves, in addition to providing a function as a code.

Consequently, a function for distinguishing between the reflected wave and noise is improved. In addition, occurrence of erroneous determination as a result of the false-code-like waveform that is generated between a reflected wave that corresponds to a segmented transmission wave and a reflected wave that corresponds to a segmented transmission wave that is transmitted immediately thereafter can be favorably suppressed.

Consequently, accuracy of the reception determination can be further improved. Furthermore, calculation load can be reduced as much as possible because the determination regarding whether the mean squared error MSE is less than the code determination threshold MSE_TH is performed within the determination time window Tw that is centered on the determination timing TS2 and the like.

Variation Examples

The present disclosure is not limited to the above-described embodiments. Therefore, the above-described embodiments can be modified as appropriate. Hereafter, typical variation examples will be described. In the descriptions of the variation examples below, differences with the above-described embodiments will mainly be described. In addition, sections according to the above-described embodiments and in the variation examples that are identical or equivalent to each other are given the same reference numbers.

Therefore, in the descriptions of the variation examples below, the descriptions according to the above-described embodiments may be applied as appropriate regarding constituent elements that have the same reference numbers as those according to the above-described embodiments, unless technical inconsistencies or special additional descriptions are present.

The object detection apparatus 1 is not limited to the onboard configuration, that is, the configuration in which the object detection apparatus 1 is mounted in the vehicle V. Therefore, specifically, for example, the object detection apparatus 1 may also be mounted in a ship or an aircraft. In addition, the object detection apparatus 1 is not limited to the configuration in which the transmitting/receiving unit 2, the drive-signal generating unit 3, the reception-signal processing unit 4, and the control unit 5 are supported by a single sensor casing.

That is, for example, all or a portion of the functional configurations that are provided in the drive-signal generating unit 3, the reception-signal processing unit 4, and the control unit 5 may be provided in a sonar ECU (not shown). ECU is an abbreviation of electronic control unit. The sonar ECU is mounted in the own vehicle so as to be connected to an ultrasonic sensor that has a configuration in which the transmitting/receiving unit 2 is supported by a sensor casing, so as to be capable of information communication over an onboard communication line.

The object detection apparatus 1 is not limited to the configuration in which a single transmitting/receiving unit 2 and a single drive-signal generating unit 3 are provided, as shown in FIG. 1. That is, the object detection apparatus 1 may include a plurality of transmitting/receiving units 2. In this case, a same number of drive-signal generating units 3 as a number of transmitting/receiving units 2 may be provided.

The object detection apparatus 1 is not limited to the integrated transmission/reception-type configuration. That is, the object detection apparatus 1 is not limited to the configuration in which transmission and reception of ultrasonic waves can be performed by a single transducer 21. Therefore, for example, the transducer 21 for transmission that is electrically connected to the transmission circuit 22 and the transducer 21 for reception that is electrically connected to the transmission circuit 23 may be provided in parallel. In other words, the transmitting unit 20A and the receiving unit 20B may each include a single transducer 21. In this case, the transmitting unit 20A and the receiving unit 20B may each be supported in a separate sensor casing.

A case in which a two-dimensional position of the object B in relation to the own vehicle is detected by triangulation using a plurality of transducers 21 is possible. In this case, for example, transmission waves that have the same frequency characteristic, that is, code sequence may be transmitted from a plurality of transducers 21 that are mounted in the own vehicle. At this time, the "regular wave" is the reception wave when the reflected wave of the transmission wave that is transmitted from the own vehicle is received by the own vehicle. In contrast, the "irregular wave" is the reception wave when the reflected wave of a transmission wave that is transmitted from another vehicle is received by the own vehicle.

Consequently, effects of interference between a plurality of vehicles can be favorably suppressed. Alternatively, for example, transmission waves that have differing frequency characteristics, that is, code sequences may be transmitted from the plurality of transducers 21 that are mounted in the own vehicle. consequently, distinction between a direct wave in which the transducer 21 on the transmission side and the transducer 21 on the reception side are the same and an indirect wave in which the transducer 21 on the transmission side and the transducer 21 on the reception side differ can be facilitated, and further, erroneous recognition due to effects of multiple reflection and the like can be favorably suppressed.

The configurations of sections such as the transmission circuit 22, the reception circuit 23, and the like are also not limited to the specific examples described according to the above-described embodiments. That is, for example, a digital/analog conversion circuit may be provided in the drive-signal generating unit 3 instead of the transmission circuit 22. That is, the drive signal may be the element input signal for the transducer 21 itself.

The code sequence of the drive signal SD may be changeable or may be unchangeable. That is, for example, the transmission control unit 51 may be configured to change the code sequence of the drive signal SD, that is, the transmission wave when the detecting unit 52 detects interference. Alternatively, the drive-signal generating unit 3 may be configured to output only a single type of drive signal SD for a single transmitting/receiving unit 2.

In this case, for example, the drive-signal generating unit 3 of the object detection apparatus 1 that is mounted in the own vehicle may output only the drive signal SD that corresponds to the three-bit code that is "110". In addition, the drive-signal generating unit 3 of the object detection apparatus 1 that is mounted in a certain other vehicle may output only the drive signal SD that corresponds to the three-bit code "100". Furthermore, the drive-signal generating unit 3 of the object detection apparatus 1 that is mounted in yet another vehicle may output only the drive signal SD that corresponds to the three-bit code "111".

When a plurality of transmitting/receiving units 2 are provided, the drive-signal generating unit 3 may be configured to input the drive signals SD that have differing code sequences to the plurality of transmitting/receiving units 2. Specifically, for example, when two transmitting/receiving units 2 are provided, the drive signal SD that corresponds to the three-bit code that is "110" may be inputted to one, and the drive signal SD that corresponds to the three-bit code that is "100" may be inputted to the other.

Processing content of the detecting unit 52 is also not limited to the specific examples described above. For example, the reception determining unit 523 may perform a determination regarding whether the coincidence level M is equal to or greater than a predetermined reference value, instead of the determination regarding whether the mean square error MSE is less than the predetermined code determination threshold MSE_TH.

That is, when the coincidence level M is equal to or greater than the predetermined reference value, the reception determining unit 523 may determine that the chirp signal of the code that corresponds to the reference signal is included in the reception wave. The coincidence level M is an indicator that indicates a degree of coincidence between the frequency signal of the reception signal and the reference signal and is shown in expression (4) below. In other words, the coincidence level M corresponds to a concept that is opposite to error.

$$M = \frac{1}{\sqrt{MSE}} \qquad (4)$$

The calculation method for the frequency shift amount and the relative velocity is also not limited to the specific examples described above. For example, instead of the frequency shift amount $\Delta f$ in expression (1) above, a frequency shift amount $k_f$ in expression (5) below can be used.

$$k_f = \sum_{i=1}^{N} \frac{f_{ri}}{R_i} \qquad (5)$$

A degree to which effects of the Doppler shift appear in the frequency of the reception signal corresponds to a ratio of the relative velocity and the speed of sound. Therefore, the frequency shift expressed by the ratio as in expression (5) above is more accurate than that expressed by the difference as in expression (1) above.

When expression (5) above is used, the relative velocity $\Delta v$ is shown in expression (6) below.

$$\Delta v = \frac{k_f - 1}{k_f + 1} c \qquad (6)$$

Here, the frequency shift amount $k_f$ can be approximately calculated by expression (7) below, as well. Consequently, calculation load is further reduced.

$$k_f = \frac{\sum_{i=1}^{N} f_{ri}}{\sum_{i=1}^{N} R_i} \qquad (7)$$

When expressions (5) to (7) above are used, pattern matching by the reception determining unit 523 is performed using expression (8) below instead of expression (3) above.

$$S_E = \sum_{i=1}^{N} (f_{ri} - k_f R_i)^2 \quad (8)$$

An error sum of squares SE that is calculated by expression (8) is N times the mean squared error MSE. Therefore, even when expression (8) is used, code determination that is similar to that in FIG. 5 and the like can be performed.

In addition, when the error sum of squares SE is a local minimum in expression (8), expression (9) below is established.

$$\frac{\partial S_E}{\partial k_f} = 0 \quad (9)$$

Expression (10) is derived from expression (8) and expression (9) above. The frequency shift amount $k_f$ shown in expression (10) may be set as the detection result of the frequency-shift detecting unit 522.

$$k_f = \frac{\sum_{i=1}^{N} f_{ri} R_i}{\sum_{i=1}^{N} R_i^2} \quad (10)$$

The code determination method is also not limited to that using the error sum of squares, the mean squared error, or the coincidence level. That is, for example, a correlation operation may be used. In this case, code determination is performed based on whether a correlation value based on a correlation operation between the reception signal and the reference signal is equal to or greater than a threshold.

In the specific example shown in FIG. 6, the downchirp frequency band fbd and the upchirp frequency band fbu are formed such that the second minimum frequency fmin2 is a higher frequency than the first minimum frequency fmin1. In addition, the downchirp frequency band fbd and the upchirp frequency band fbu are formed such that the second maximum frequency fmax2 is a higher frequency than the first maximum frequency fmax1. However, the present disclosure is not limited to this mode. That is, for example, the second minimum frequency fmin2 may be a lower frequency than the first minimum frequency fmin1, and the second maximum frequency fmax2 may be a lower frequency than the first maximum frequency fmax1.

The waveform of the segmented drive signal is also not limited to the specific examples described above. That is, for example, the increasing speed and the decrease speed of the frequency in the V-shaped chirp wave may differ. In addition, the increase time and the decrease time of the frequency may be identical or may differ. Instead of the V-shaped chirp wave, a chirp wave in which the frequency monotonically increases or decreases may be used. A mode by which the frequency increases or decreases may be linear or non-linear, such as a sigmoid curve shape. Furthermore, an interval period may be provided between the segmented drive signals that are adjacent to each other, among the plurality of segmented drive signals SD1 and the like.

In the specific examples described above, the segmented drive signals and the segmented transmission waves that have the upchirp-like frequency change mode, and the segmented drive signals and the segmented transmission waves that have the downchirp-like frequency change mode are used. However, the present disclosure is not limited to these modes.

Specifically, the CW wave can also be used as the segmented drive signal and the segmented transmission wave. In this case, for example, the code "1" may be used for the upchirp-like frequency change mode, the code "0" may be used for the CW wave, and a code "−1" may be used for the downchirp-like frequency change mode. Alternatively, in consideration of mounting, a code "01" may be used for the upchirp-like frequency change mode, the code "11" may be used for the CW wave, and a code "10" may be used for the downchirp-like frequency change mode, using binary numbers.

Even when the CW wave is used, at least the leading transmission wave and the leading drive signal SD1 that corresponds thereto are preferably encoded by frequency modulation. A reason for this is that, because the leading bit is not easily affected by interference, the leading bit is suitable as a reference bit. In addition, a reason for this is that, as a result of encoding being performed by frequency modulation, the waveform of the mean squared error MSE in pattern matching becomes sharp, and variations in coincidence points, that is, local minimum points on the time axis decrease.

In particular, chirp encoding in which the frequency changes in a V-shape or an inverted V-shape with the elapse of time is preferable. Consequently, accuracy of the reception determination can be further improved. In particular, detection accuracy regarding the frequency shift amount is improved. Alternatively, setting accuracy regarding the determination timings, that is, the reception times TR and TR1, and the determination time window Tw is improved.

In the specific examples described above, a number of segmented drive signals that are included in the drive signal SD is three. However, the present disclosure is not limited to this mode. That is, the number of segmented drive signals that are included in the drive signal SD may be two, or four or more. In other words, a number of bits or a number of bytes in the code sequence of the drive signal Sd is not particularly limited.

Figure 23:
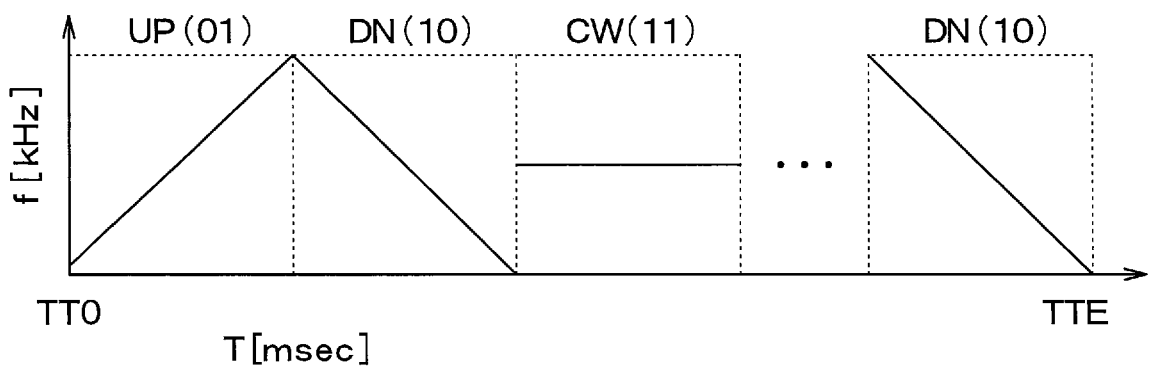
FIG. 23 is a timing chart illustrating the frequency characteristic in another example of the drive signal that is outputted from the drive-signal generating unit shown in FIG. 1 and FIG. 14.

FIG. 17 to FIG. 22 show examples of the drive signal SD when the segmented drive signals that are included in the drive signal SD are two. FIG. 23 shows an example of the drive signal SD when the segmented drive signals that are included in the drive signal SD are four or more.

As shown in FIG. 17 to FIG. 23, in a preferred example, the leading segmented drive signal among the plurality of segmented drive signals has frequency modulation of some sort that is not CW. In correspondence, the leading transmission wave that is the leading transmission wave among the plurality of segmented transmission waves also has frequency modulation of some sort that is not CW. Meanwhile, the segmented drive signal that is not the leading segmented drive signal among the plurality of segmented drive signals may be CW. Alternatively, the segmented drive signal that is not the leading segmented drive signal among the plurality of segmented drive signals may be encoded by encoding other than chirp encoding, such as phase modulation, frequency-shift keying, or ON-OFF modulation.

"Equal to or greater than a threshold" and "exceeds a threshold" are interchangeable. In a similar manner, "less than a threshold" and "equal to or less than a threshold" are interchangeable.

It goes without saying that an element that configures an above-described embodiment is not necessarily a requisite unless particularly specified as being a requisite, clearly considered a requisite in principle, or the like. In addition, in cases in which a numeric value, such as quantity, numeric value, amount, or range, of a constituent element is stated, the present disclosure is not limited to the specific number unless particularly specified as being a requisite, clearly limited to the specific number in principle, or the like.

In a similar manner, when a shape, a direction, a positional relationship, or the like of a constituent element or the like is mentioned, excluding cases in which the shape, the direction, the positional relationship, or the like is clearly described as particularly being a requisite, is clearly limited to a specific shape, direction, positional relationship, or the like in principle, or the like, the present disclosure is not limited to the shape, direction, positional relationship, or the like.

The variation examples are also not limited to the examples given above. In addition, a plurality of variation examples may be combined with each other. Furthermore, all or a portion of the above-described embodiments and all or a portion of the variation examples may be combined with each other.

The functional configurations and methods described above may be actualized by a dedicated computer that is provided so as to be configured by a processor and a memory, the processor being programmed to provide one or a plurality of functions that are realized by a computer program. Alternatively, the functional configurations and methods described above may be actualized by a dedicated computer that is provided by a processor being configured by a single dedicated hardware logic circuit or more. Still alternatively, the functional configurations and methods described above may be actualized by a single dedicated computer or more, the dedicated computer being configured by a combination of a processor that is programmed to provide one or a plurality of functions, a memory, and a processor that is configured by a single hardware logic circuit or more.

Specifically, the control unit 5 is not limited to a known microcomputer that includes the CPU and the like. That is, the control unit 5 may, in its entirety or in part, be a digital circuit, such as an ASIC or an FPGA of a gate array or the like, that is configured to be capable of actualizing functions such as those described above. ASIC is an abbreviation of application specific integrated circuit. FPGA is an abbreviation of field programmable gate array.

In addition, the computer program may be stored in a non-transitory tangible recording medium that can be read by a computer as instructions performed by the computer. That is, the apparatus and method of the present disclosure can be expressed as a computer program that includes steps for actualizing the functions or methods described above, or a non-transitory tangible storage medium in which the program is stored.

SUMMARY

The present disclosure that is described according to the above-described embodiments and variation examples include the following aspects. Here, the aspects described below can be applied in combination with each other as long as technical contradictions do not occur.

According to a first aspect, an object detection apparatus that is configured to detect an object in a vicinity of a moving body to which it is mounted includes a drive-signal generating unit and a detecting unit. The drive-signal generating unit is provided so as to generate a drive signal that drives a transmitting unit that includes a transmitter that transmits a transmission wave that is an ultrasonic wave externally, and output the drive signal to the transmitting unit. The drive-signal generating unit generates a first drive signal and a second drive signal, and outputs the first drive signal and the second drive signal towards the transmitting unit.

The first drive signal is a drive signal that corresponds to a first transmission wave. The second drive signal is a drive signal that corresponds to a second transmission wave. The first transmission wave and the second transmission wave are included in a plurality of transmission waves that are continuously transmitted from a start of a transmission process of a transmission wave to an end of the transmission process, and are respectively encoded based on waveform patterns. That is, the first transmission wave is one of the plurality of transmission waves. In addition, the second transmission wave is another of the plurality of transmission waves that is transmitted after the first transmission wave.

The detecting unit is provided so as to detect an object based on a reception signal that corresponds to a reception result of a receiver that receives a reception wave that includes a reflected wave from the object of the transmission wave. The detecting unit performs reception determination regarding the reflected wave based on a frequency signal that corresponds to a waveform pattern of the reception signal and a reference signal that corresponds to a waveform pattern of the first drive signal. As a result, identification accuracy can be improved from that in the past.

Specifically, in this configuration, the drive-signal generating unit generates the first drive signal that corresponds to the first transmission wave that is encoded based on the waveform pattern and outputs the first drive signal to the transmitting unit. In addition, the drive-signal generating unit generates the second drive signal that corresponds to the second transmission wave that is the transmission wave that is transmitted after the first transmission wave and is encoded based on the waveform pattern, and outputs the second drive signal to the transmitting unit.

As a result, the plurality of transmission waves that include the first transmission wave and the second transmission wave are continuously transmitted from the start of the transmission process to the end of the transmission process. In addition, the plurality of transmission waves are respectively encoded based on the waveform patterns of the drive signals. The detecting unit detects an object based on the reception signal that corresponds to the reception result of the receiver. At this time, the detecting unit performs the reception determination regarding the reflected wave based on the frequency signal that corresponds to the waveform pattern of the reception signal and the reference signal that corresponds to the waveform pattern of the drive signal.

That is, in this configuration, a plurality of transmission waves that are respectively encoded based on the waveform patterns of the drive signals are transmitted from the start of the transmission process to the end of the transmission process. The plurality of transmission waves include the first transmission wave that is encoded based on the waveform pattern of the first drive signal. In addition, the plurality of transmission waves include the second transmission wave that is encoded based on the waveform pattern of the second drive signal and is transmitted after the first transmission wave.

Therefore, when the reflected waves that are generated by the plurality of transmission waves being reflected by an object are received by the receiver as the reception waves, the reception waves include the reflected wave that corresponds to the first transmission wave and the reflected wave that corresponds to the second transmission wave that is transmitted after the first transmission wave. Here, in the reception determination regarding the reflected wave, at least the reference signal that corresponds to the waveform pattern of the first drive signal, that is, the first transmission wave is used.

According to a second aspect, the detecting unit according to the first aspect performs the reception determination regarding the reflected wave that corresponds to the first transmission wave based on a first reference signal that is a reference signal that corresponds to the waveform pattern of the first drive signal. In addition, the detecting unit performs the reception determination regarding the reflected wave that corresponds to the second transmission wave based on a second reference signal that is a reference signal that corresponds to the waveform pattern of the second drive signal.

In this configuration, the reception determination regarding the reflected wave that corresponds to the first transmission wave that is encoded based on the waveform pattern of the first drive signal is performed based on the first reference signal that corresponds to the waveform pattern of the first drive signal. In addition, the reception determination regarding the reflected wave that corresponds to the second transmission wave that is encoded based on the waveform pattern of the second drive signal is performed based on the second reference signal that corresponds to the waveform pattern of the second drive signal. Consequently, accuracy of the reception determination can be further improved.

According to a third aspect, the detecting unit according to the first and second aspects includes a frequency-shift detecting unit. The frequency-shift detecting unit detects a frequency shift amount between the transmission wave and the reflected wave based on a relative velocity between the moving body and the object. In addition, the detecting unit performs the reception determination regarding the reflected wave that corresponds to the second transmission wave based on the frequency shift amount that is detected from the reflected wave that corresponds to the first transmission wave.

In this configuration, the frequency shift amount that is based on the relative velocity between the moving body and the object in the vicinity thereof is detected from the reflected wave that corresponds to the first transmission wave. Here, a speed of sound that is a propagation speed of the transmission wave and the reflected wave is sufficiently faster than the movement speeds of the moving body and the object in the vicinity thereof. Therefore, the frequency shift amount, that is, the relative velocity can be considered to be unchanged at time of transmission/reception of the first transmission wave and time of transmission/reception of the subsequent second transmission wave.

Therefore, the detecting unit performs the reception determination regarding the reflected wave that corresponds to the subsequent second transmission wave based on the frequency shift amount that is detected from the reflected wave that corresponds to the first transmission wave. That is, as a result of encoding of the first transmission wave, Doppler shift correction in the reception determination regarding the reflected wave that corresponds to the subsequent second transmission wave can be favorably performed. Consequently, accuracy of the reception determination when the moving body and the object in the vicinity thereof are moving in relation to each other can be further improved.

According to a fourth aspect, the detecting unit according to the first to third aspects includes a reference-time setting unit, a timing setting unit, and a reception determining unit. The reference-time setting unit sets a reference time based on a reception determination result regarding the reflected wave that corresponds to the first transmission wave. The timing setting unit sets a determination timing with reference to the reference time that is set by the reference-time setting unit. The reception determining unit performs the reception determination regarding the reflected wave that corresponds to the second transmission wave at the determination timing that is set by the timing setting unit.

In this configuration, the reception determination regarding the reflected wave that corresponds to the second transmission wave is performed at the determination timing that is set based on the reception determination result regarding the reflected wave that corresponds to the first transmission wave, with reference to the reference time. That is, the first transmission wave provides a synchronization function in the reception determination regarding a reflected wave that corresponds to a subsequent transmission wave, in addition to providing a function as a code. Consequently, a function for distinguishing between the reflected wave and noise is improved.

In addition, occurrence of erroneous determination as a result of a false code that is generated between the reflected wave that corresponds to the first transmission wave and the reflected wave that corresponds to the transmission wave that is transmitted immediately after the first transmission wave can be favorably suppressed. Furthermore, the false code may be generated when a plurality of reflected waves are received in an overlapping manner. In this case, as a result of a subsequent bit being determined with reference to a leading bit that has high reliability and is not overlapping, an accurate determination can be performed. Consequently, accuracy of the reception determination can be further improved.

A fifth aspect is the first to fourth aspects in which at least the first transmission wave is encoded by frequency modulation. Consequently, accuracy of the reception determination can be further improved. In particular, detection accuracy regarding the frequency shift amount and setting accuracy regarding the determination timing are improved.

A sixth aspect is the fifth aspect in which at least the first transmission wave is chirp-encoded such that a frequency changes in a V-shape or an inverted V-shape with the elapse of time. Consequently, accuracy of the reception determination can be further improved. In particular, detection accuracy regarding the frequency shift amount and setting accuracy regarding the determination timing are improved.

A seventh aspect is the fifth and sixth aspects in which the first drive signal is formed such that a frequency changes with the elapse of time in a first frequency band that is formed by a first minimum frequency and a first maximum frequency. In addition, the second drive signal is formed such that a frequency changes with the elapse of time in a second frequency band that is formed by a second minimum frequency and a second maximum frequency. Furthermore, the first frequency band and the second frequency band are set so as to partially overlap each other.

A false code-like waveform that is similar to the waveform pattern of the first drive signal or the second drive signal may be generated between the reflected wave that corresponds to the first transmission wave and the reflected wave that corresponds to the second transmission wave that is transmitted immediately after the first transmission wave. In this regard, in this configuration, an offset is provided between the first frequency band that is the frequency band of the first drive signal and the second frequency band that is the frequency band of the second drive signal.

Therefore, for example, a degree of coincidence of the above-described false code-like waveform to the reference signal that corresponds to the first transmission wave or the second transmission wave decreases. Alternatively, consistency between the frequency shift amount or a calculation value of the relative velocity that corresponds to the above-described false-code-like waveform, and the frequency shift amount or the calculation value of the relative velocity that corresponds another section of the reflected wave decreases. Therefore, the occurrence of erroneous determination caused by a false code can be favorably suppressed. Consequently, accuracy of the reception determination can be further improved.

According to an eighth aspect, the first frequency band and the second frequency band according to the seventh aspect are set so as to include a resonance frequency of the transmitting unit. Consequently, sound pressure of the transmission wave and reception sensitivity regarding the reflected wave are improved.

A ninth aspect is the seventh and eighth aspects in which the second minimum frequency is a higher frequency than the first minimum frequency, and the second maximum frequency is a higher frequency than the first maximum frequency. Alternatively, the second minimum frequency is a lower frequency than the first minimum frequency, and the second maximum frequency is a lower frequency than the first maximum frequency. Consequently, the offset between the first frequency band that is the frequency band of the first drive signal and the second frequency band that is the frequency band of the second drive signal can be favorably set.

According to a tenth aspect, the detecting unit according to the first aspect performs the reception determination regarding the reflected wave based on a composite reference signal in which the reference signal that corresponds to the first drive signal and the reference signal that corresponds to the second drive signal are combined.

In this configuration, a plurality of transmission waves that are respectively encoded based on the waveform patterns of the drive signals are transmitted from the start of the transmission process to the end of the transmission process. The plurality of transmission waves include the first transmission wave that is encoded based on the waveform pattern of the first drive signal. In addition, the plurality of transmission waves include the second transmission wave that is encoded based on the waveform pattern of the second drive signal and is transmitted after the first transmission wave.

Therefore, when the reflected waves that are generated by the plurality of transmission waves being reflected by an object are received by the receiver as the reception waves, the reception waves include the reflected wave that corresponds to the first transmission wave and the reflected wave that corresponds to the second transmission wave that is transmitted after the first transmission wave. Here, in the reception determination regarding the reflected wave, the composite reference signal in which the reference signal that corresponds to the first drive signal and the reference signal that corresponds to the second drive signal are combined is used. Consequently, accuracy of the reception determination can be further improved.

According to an eleventh aspect, the detecting unit according to the tenth aspect includes a frequency-shift detecting unit. The frequency-shift detecting unit detects a frequency shift amount between the transmission wave and the reflected wave based on a relative velocity between the moving body and the object. In addition, the detecting unit performs the reception determination regarding the reflected wave based on the frequency shift amount that is detected from the reflected wave.

In this configuration, the frequency shift amount based on the relative velocity between the moving body and the object in the vicinity thereof is detected from the reflected wave that corresponds to the transmission wave. Here, a speed of sound that is a propagation speed of the transmission wave and the reflected wave is sufficiently faster than the movement speeds of the moving body and the object in the vicinity thereof. Therefore, the frequency shift amount, that is, the relative velocity can be considered to be unchanged during transmission/reception that corresponds to a plurality of transmission waves that are continuously transmitted.

Therefore, the detecting unit performs the reception determination regarding the reflected wave based on the frequency shift amount that is detected from the reflected wave that corresponds to the transmission wave. Consequently, the accuracy of the reception determination when the moving body and the object in the vicinity thereof are moving relative to each other can be further improved. In addition, as a result of the frequency shift amount, that is, the relative velocity being detected using the reference signal that corresponds to the first drive signal that is a leading bit portion of the composite reference signal, and the determination regarding a subsequent bit being performed with reference thereto, calculation load can be reduced as much as possible.

A twelfth aspect is the tenth and eleventh aspects in which at least the first transmission wave is encoded by frequency modulation. Consequently, accuracy of the reception determination can be further improved. In particular, detection accuracy regarding the frequency shift amount is improved.

A thirteenth aspect is the twelfth aspect in which at least the first transmission wave is chirp-encoded such that a frequency changes in a V-shape or an inverted V-shape with the elapse of time. Consequently, accuracy of the reception determination can be further improved. In particular, detection accuracy regarding the frequency shift amount is improved.

A fourteenth aspect is the twelfth and thirteenth aspects in which the first drive signal is formed such that a frequency changes with the elapse of time in a first frequency band that is formed by a first minimum frequency and a first maximum frequency. In addition, the second drive signal is formed such that a frequency changes with the elapse of time in a second frequency band that is formed by a second minimum frequency and a second maximum frequency. Furthermore, the first frequency band and the second frequency band are set so as to partially overlap each other.

A false code-like waveform that is similar to the waveform pattern of the first drive signal or the second drive signal may be generated between the reflected wave that corresponds to the first transmission wave and the reflected wave that corresponds to the transmission wave that is transmitted immediately after the first transmission wave. In this regard, in this configuration, an offset is provided between the first frequency band that is the frequency band of the first drive signal and the second frequency band that is the frequency band of the second drive signal.

Therefore, a degree of coincidence of the above-described false code-like waveform to the reference signal that corresponds to the first transmission wave or the second transmission wave decreases. Alternatively, consistency between the frequency shift amount or a calculation value of the relative velocity that corresponds to the above-described false-code-like waveform, and the frequency shift amount or the calculation value of the relative velocity that corresponds another section of the reflected wave decreases. Therefore, the occurrence of erroneous determination caused by a false code can be favorably suppressed. Consequently, accuracy of the reception determination can be further improved.

According to a fifteenth aspect, the first frequency band and the second frequency band according to the fourteenth aspect are set so as to include a resonance frequency of the transmitting unit. Consequently, sound pressure of the transmission wave and reception sensitivity regarding the reflected wave are improved.

A sixteenth aspect is the fourteenth and the fifteenth aspects in which the second minimum frequency is a higher frequency than the first minimum frequency, and the second maximum frequency is a higher frequency than the first maximum frequency. Alternatively, the second minimum frequency is a lower frequency than the first minimum frequency, and the second maximum frequency is a lower frequency than the first maximum frequency. Consequently, the offset between the first frequency band that is the frequency band of the first drive signal and the second frequency band that is the frequency band of the second drive signal can be favorably set.

According to a seventeenth aspect, an object detection method in which an object in a vicinity of a moving body is detected uses a drive-signal generating unit and a detecting unit. The drive-signal generating unit generates a drive signal that drives a transmitting unit that includes a transmitter that transmits a transmission wave that is an ultrasonic wave externally, and output the drive signal to the transmitting unit. The drive-signal generating unit generates a first drive signal and a second drive signal, and outputs the first drive signal and the second drive signal towards the transmitting unit.

The first drive signal is a drive signal that corresponds to a first transmission wave. The second drive signal is a drive signal that corresponds to a second transmission wave. The first transmission wave and the second transmission wave are included in a plurality of transmission waves that are continuously transmitted from a start of a transmission process of a transmission wave to an end of the transmission process, and are respectively encoded based on waveform patterns. The second transmission wave is transmitted after the first transmission wave.

The detecting unit detects an object based on a reception signal that corresponds to a reception result of a receiver that receives a reception wave that includes a reflected wave from an object of the transmission wave. The detecting unit performs reception determination regarding the reflected wave based on a frequency signal that corresponds to a waveform pattern of the reception signal and a reference signal that corresponds to a waveform pattern of the first drive signal. As a result, identification accuracy can be improved from that in the past.

Specifically, in this method, a plurality of transmission waves that are respectively encoded based on the waveform patterns of the drive signals are transmitted from the start of the transmission process to the end of the transmission process. The plurality of transmission waves include the first transmission wave that is encoded based on the waveform pattern of the first drive signal. In addition, the plurality of transmission waves include the second transmission wave that is encoded based on the waveform pattern of the second drive signal.

Therefore, when the reflected waves that are generated by the plurality of transmission waves being reflected by an object are received by the receiver as the reception waves, the reception waves include the reflected wave that corresponds to the first transmission wave and the reflected wave that corresponds to the second transmission wave that is transmitted after the first transmission wave. Here, in the reception determination regarding the reflected wave, at least the reference signal that corresponds to the waveform pattern of the first drive signal, that is, the first transmission wave is used.

According to an eighteenth aspect, the method according to the seventeenth aspect performs a following process through the detecting unit. The reception determination regarding the reflected wave that corresponds to the first transmission wave based on a first reference signal that is a reference signal that corresponds to the waveform pattern of the first drive signal is performed. In addition, the reception determination regarding the reflected wave that corresponds to the second transmission wave based on a second reference signal that is a reference signal that corresponds to the waveform pattern of the second drive signal is performed.

In this method, the reception determination regarding the reflected wave that corresponds to the first transmission wave that is encoded based on the waveform pattern of the first drive signal is performed based on the first reference signal that corresponds to the waveform pattern of the first drive signal. In addition, the reception determination regarding the reflected wave that corresponds to the second transmission wave that is encoded based on the waveform pattern of the second drive signal is performed based on the second reference signal that corresponds to the waveform pattern of the second drive signal. Consequently, accuracy of the reception determination can be further improved.

According to a nineteenth aspect, the method according to the seventeenth and eighteenth aspects performs a following process through the detecting unit. A frequency shift amount between the transmission wave and the reflected wave based on a relative velocity between the moving body and the object is detected. In addition, the reception determination regarding the reflected wave that corresponds to the second transmission wave is performed based on the frequency shift amount that is detected from the reflected wave that corresponds to the first transmission wave.

In this method, the frequency shift amount that is based on the relative velocity between the moving body and the object in the vicinity thereof is detected from the reflected wave that corresponds to the first transmission wave. Here, a speed of sound that is a propagation speed of the transmission wave and the reflected wave is sufficiently faster than the movement speeds of the moving body and the object in the vicinity thereof. Therefore, the frequency shift amount, that is, the relative velocity can be considered to be unchanged at time of transmission/reception of the first transmission wave and time of transmission/reception of the subsequent second transmission wave.

Therefore, this method performs the reception determination regarding the reflected wave that corresponds to the subsequent second transmission wave based on the frequency shift amount that is detected from the reflected wave that corresponds to the first transmission wave. That is, the first transmission wave provides a Doppler shift correction function in the reception determination regarding a reflected wave that corresponds to a subsequent transmission wave, in addition to providing a function as a code. Consequently, accuracy of the reception determination when the moving body and the object in the vicinity thereof are moving in relation to each other can be further improved.

According to a twentieth embodiment, the method according to the seventeenth to nineteenth aspects performs a following process through the detecting unit. A reference time is set based on a reception determination result regarding the reflected wave that corresponds to the first transmission wave. In addition, a determination timing is set with reference to the reference time that is set. Furthermore, the reception determination regarding the reflected wave that corresponds to the second transmission wave is performed at the determination timing that is set.

In this method, the reception determination regarding the reflected wave that corresponds to the second transmission wave is performed at the determination timing that is set based on the reception determination result regarding the reflected wave that corresponds to the first transmission wave, with reference to the reference time. That is, the first transmission wave provides a synchronization function in the reception determination regarding a reflected wave that corresponds to a subsequent transmission wave, in addition to providing a function as a code. Consequently, a function for distinguishing between the reflected wave and noise is improved.

In addition, occurrence of erroneous determination as a result of a false code that is generated between the reflected wave that corresponds to the first transmission wave and the reflected wave that corresponds to the transmission wave that is transmitted immediately after the first transmission wave can be favorably suppressed. Furthermore, the false code may be generated when a plurality of reflected waves are received in an overlapping manner. In this case, as a result of a subsequent bit being determined with reference to a leading bit that has high reliability and is not overlapping, an accurate determination can be performed. Consequently, accuracy of the reception determination can be further improved.

According to a twenty-first aspect, the method according to the seventeenth to twentieth aspects encodes at least the first transmission wave by frequency modulation. Consequently, accuracy of the reception determination can be further improved. In particular, detection accuracy regarding the frequency shift amount and setting accuracy regarding the determination timing are improved.

According to a twenty-second aspect, the method according to the twenty-first aspect chirp-encodes at least the first transmission wave such that a frequency changes in a V-shape or an inverted V-shape with the elapse of time. Consequently, accuracy of the reception determination can be further improved. In particular, detection accuracy regarding the frequency shift amount and setting accuracy regarding the determination timing are improved.

According to a twenty-third aspect, the method according to the twenty-first and twenty-second aspects performs a following process. The first drive signal is formed such that a frequency changes with the elapse of time in a first frequency band that is formed by a first minimum frequency and a first maximum frequency. The second drive signal is formed such that a frequency changes with the elapse of time in a second frequency band that is formed by a second minimum frequency and a second maximum frequency, and partially overlaps the first frequency band.

A false code-like waveform that is similar to the waveform pattern of the first drive signal or the second drive signal may be generated between the reflected wave that corresponds to the first transmission wave and the reflected wave that corresponds to the transmission wave that is transmitted immediately after the first transmission wave. In this regard, in this method, an offset is provided between the first frequency band that is the frequency band of the first drive signal and the frequency band that is the frequency band of the second drive signal.

Therefore, for example, a degree of coincidence of the above-described false code-like waveform to the reflected wave that corresponds to the first transmission wave or the second transmission wave decreases. Alternatively, consistency between the frequency shift amount or a calculation value of the relative velocity that corresponds to the above-described false-code-like waveform, and the frequency shift amount or the calculation value of the relative velocity that corresponds another section of the reflected wave decreases. Therefore, the occurrence of erroneous determination caused by a false code can be favorably suppressed. Consequently, accuracy of the reception determination can be further improved.

According to a twenty-fourth aspect, the method according to the twenty-third aspect sets the first frequency band and the second frequency band so as to include a resonance frequency of the transmitting unit. Consequently, sound pressure of the transmission wave and reception sensitivity regarding the reflected wave are improved.

According to a twenty-fifth aspect, the method according to the twenty-third and twenty-fourth aspects set the second minimum frequency to a higher frequency than the first minimum frequency, and the second maximum frequency to a higher frequency than the first maximum frequency. Alternatively, this method sets the second minimum frequency to a lower frequency than the first minimum frequency, and the second maximum frequency to a lower frequency than the first maximum frequency. Consequently, the offset between the first frequency band that is the frequency band of the first drive signal and the second frequency band that is the frequency band of the second drive signal can be favorably set.

According to a twenty-sixth aspect, the method according to the seventeenth aspect performs, through the detecting unit, the reception determination regarding the reflected wave based on a composite reference signal in which the reference signal that corresponds to the first drive signal and the reference signal that corresponds to the second drive signal are combined.

In this method, a plurality of transmission waves that are respectively encoded based on the waveform patterns of the drive signals are transmitted from the start of the transmission process to the end of the transmission process. The plurality of transmission waves include the first transmission wave that is encoded based on the waveform pattern of the first drive signal. In addition, the plurality of transmission waves include the second transmission wave that is encoded based on the waveform pattern of the second drive signal and is transmitted after the first transmission wave.

Therefore, when the reflected waves that are generated by the plurality of transmission waves being reflected by an object are received by the receiver as the reception waves, the reception waves include the reflected wave that corresponds to the first transmission wave and the reflected wave that corresponds to the second transmission wave that is transmitted after the first transmission wave. Here, in the reception determination regarding the reflected wave, the composite reference signal in which the reference signal that corresponds to the first drive signal and the reference signal that corresponds to the second drive signal are combined is used. Consequently, accuracy of the reception determination can be further improved.

According to a twenty-seventh aspect, the method according to the seventeenth aspect performs a following process through the detecting unit. A frequency shift amount between the transmission wave and the reflected wave based on a relative velocity between the moving body and the object is detected. The reception determination regarding the reflected wave that corresponds to the second transmission wave is performed based on the frequency shift amount that is detected from the reflected wave that corresponds to the first transmission wave.

In this method, the frequency shift amount based on the relative velocity between the moving body and the object in the vicinity thereof is detected from the reflected wave that corresponds to the transmission wave. Here, a speed of sound that is a propagation speed of the transmission wave and the reflected wave is sufficiently faster than the movement speeds of the moving body and the object in the vicinity thereof. Therefore, the frequency shift amount, that is, the relative velocity can be considered to be unchanged during transmission/reception that corresponds to a plurality of transmission waves that are continuously transmitted.

Therefore, this method performs the reception determination regarding the reflected wave based on the frequency shift amount that is detected from the reflected wave that corresponds to the transmission wave. Consequently, the accuracy of the reception determination when the moving body and the object in the vicinity thereof are moving relative to each other can be further improved. In addition, as a result of the frequency shift amount, that is, the relative velocity being detected using the reference signal that corresponds to the first drive signal that is a leading bit portion of the composite reference signal, and the determination regarding a subsequent bit being performed with reference thereto, calculation load can be reduced as much as possible.

According to a twenty-eighth aspect, the method according to the twenty-sixth and twenty-seventh aspect encodes at least the first transmission wave by frequency modulation. Consequently, accuracy of the reception determination can be further improved. In particular, detection accuracy regarding the frequency shift amount is improved.

According to a twenty-ninth aspect, the method according to the twenty-eighth aspect chirp-encodes at least the first transmission wave such that a frequency changes in a V-shape or an inverted V-shape with the elapse of time. Consequently, accuracy of the reception determination can be further improved. In particular, detection accuracy regarding the frequency shift amount is improved.

According to a thirtieth aspect, the method according to the twenty-eighth and twenty-ninth aspect performs a following process. The first drive signal is formed such that a frequency changes with the elapse of time in a first frequency band that is formed by a first minimum frequency and a first maximum frequency. The second drive signal is formed such that a frequency changes with the elapse of time in a second frequency band that is formed by a second minimum frequency and a second maximum frequency, and partially overlaps the first frequency band.

A false code-like waveform that is similar to the waveform pattern of the first drive signal or the second drive signal may be generated between the reflected wave that corresponds to the first transmission wave and the reflected wave that corresponds to the transmission wave that is transmitted immediately after the first transmission wave. In this regard, in this method, an offset is provided between the first frequency band that is the frequency band of the first drive signal and the second frequency band that is the frequency band of the second drive signal.

Therefore, a degree of coincidence of the above-described false code-like waveform to the reflected wave that corresponds to the second transmission wave decreases. Alternatively, consistency between the frequency shift amount or a calculation value of the relative velocity that corresponds to the above-described false-code-like waveform, and the frequency shift amount or the calculation value of the relative velocity that corresponds another section of the reflected wave decreases. Therefore, the occurrence of erroneous determination caused by a false code can be favorably suppressed. Consequently, accuracy of the reception determination can be further improved.

According to a thirty-first aspect, the first frequency band and the second frequency band according to the thirtieth aspect are set to include a resonance frequency of the transmitting unit. Consequently, sound pressure of the transmission wave and reception sensitivity regarding the reflected wave are improved.

According to a thirty-second aspect, the method according to the thirtieth and thirty-first aspects sets the second minimum frequency to a higher frequency than the first minimum frequency, and the second maximum frequency to a higher frequency than the first maximum frequency. Alternatively, this method sets the second minimum frequency to a lower frequency than the first minimum frequency, and the second maximum frequency to a lower frequency than the first maximum frequency. Consequently, the offset between the first frequency band that is the frequency band of the first drive signal and the second frequency band that is the frequency band of the second drive signal can be favorably set.

What is claimed is:

1. An object detection apparatus that is configured to detect an object in a vicinity of a moving body to which it is mounted, the object detection apparatus comprising one or more processors configured to implement:
a drive-signal generating unit that is provided so as to generate a drive signal that drives a transmitting unit that includes a transmitter that transmits a transmission wave that is an ultrasonic wave externally, and output the drive signal to the transmitting unit; and
a detecting unit that is provided to detect the object based on a reception signal that corresponds to a reception result of a receiver that receives a reception wave that includes a reflected wave from the object of the transmission wave, wherein
the drive-signal generating unit
generates a first drive signal that is the drive signal that corresponds to a first transmission wave that is included in a plurality of transmission waves that are continuously transmitted from a start of a transmission process of the transmission wave to an end of the transmission process, the first transmission wave encoded based on waveform patterns, and the drive-signal generating unit outputs the first drive signal to the transmitting unit, and
generates a second drive signal that is the drive signal that corresponds to a second transmission wave that is included in the plurality of transmission waves and transmitted after the first transmission wave, and the drive-signal generating unit outputs the second drive signal to the transmitting unit, and
the detecting unit performs reception determination regarding the reflected wave based on a frequency signal that corresponds to a waveform pattern of the reception signal and a reference signal that corresponds to a waveform pattern of the first drive signal, wherein
the detecting unit
includes a frequency-shift detecting unit that detects a frequency shift amount between the transmission wave and the reflected wave based on a relative velocity between the moving body and the object, and performs the reception determination regarding the reflected wave that corresponds to the second transmission wave based on the frequency shift amount that is detected from the reflected wave that corresponds to the first transmission wave.

2. The object detection apparatus according to claim 1, wherein the detecting unit performs the reception determination regarding the reflected wave that corresponds to the first transmission wave based on a first reference signal that is the reference signal that corresponds to the waveform pattern of the first drive signal and performs the reception determination regarding the reflected wave that corresponds to the second transmission wave based on a second reference signal that is the reference signal that corresponds to the waveform pattern of the second drive signal.

3. An object detection apparatus that is configured to detect an object in a vicinity of a moving body to which it is mounted, the object detection apparatus comprising one or more processors configured to implement:

a drive-signal generating unit that is provided so as to generate a drive signal that drives a transmitting unit that includes a transmitter that transmits a transmission wave that is an ultrasonic wave externally, and output the drive signal to the transmitting unit; and a detecting unit that is provided to detect the object based on a reception signal that corresponds to a reception result of a receiver that receives a reception wave that includes a reflected wave from the object of the transmission wave, wherein the drive-signal generating unit generates a first drive signal that is the drive signal that corresponds to a first transmission wave that is included in a plurality of transmission waves that are continuously transmitted from a start of a transmission process of the transmission wave to an end of the transmission process, the first transmission wave encoded based on waveform patterns, and the drive-signal generating unit outputs the first drive signal to the transmitting unit, and generates a second drive signal that is the drive signal that corresponds to a second transmission wave that is included in the plurality of transmission waves and transmitted after the first transmission wave, and the drive-signal generating unit outputs the second drive signal to the transmitting unit, and the detecting unit performs reception determination regarding the reflected wave based on a frequency signal that corresponds to a waveform pattern of the reception signal and a reference signal that corresponds to a waveform pattern of the first drive signal, wherein the detecting unit includes a reference-time setting unit that sets a reference time based on a reception determination result regarding the reflected wave that corresponds to the first transmission wave, a timing setting unit that sets a determination timing with reference to the reference time that is set by the reference-time setting unit, and a reception determining unit that performs the reception determination regarding the reflected wave that corresponds to the second transmission wave at the determination timing that is set by the timing setting unit.

4. The object detection apparatus according to claim 1, wherein at least the first transmission wave is encoded by frequency modulation.

5. The object detection apparatus according to claim 4, wherein at least the first transmission wave is chirp-encoded such that a frequency changes in a V-shape or an inverted V-shape with elapse of time.

6. The object detection apparatus according to claim 4, wherein:

the first drive signal is formed such that a frequency changes with elapse of time in a first frequency band that is formed by a first minimum frequency and a first maximum frequency;

the second drive signal is formed such that a frequency changes with elapse of time in a second frequency band that is formed by a second minimum frequency and a second maximum frequency; and the first frequency band and the second frequency band are set so as to partially overlap each other.

7. An object detection apparatus that is configured to detect an object in a vicinity of a moving body to which it is mounted, the object detection apparatus comprising one or more processors configured to implement:

a drive-signal generating unit that is provided so as to generate a drive signal that drives a transmitting unit that includes a transmitter that transmits a transmission wave that is an ultrasonic wave externally, and output the drive signal to the transmitting unit; and a detecting unit that is provided to detect the object based on a reception signal that corresponds to a reception result of a receiver that receives a reception wave that includes a reflected wave from the object of the transmission wave, wherein the drive-signal generating unit generates a first drive signal that is the drive signal that corresponds to a first transmission wave that is included in a plurality of transmission waves that are continuously transmitted from a start of a transmission process of the transmission wave to an end of the transmission process, the first transmission wave encoded based on waveform patterns, and the drive-signal generating unit outputs the first drive signal to the transmitting unit, and generates a second drive signal that is the drive signal that corresponds to a second transmission wave that is included in the plurality of transmission waves and transmitted after the first transmission wave, and the drive-signal generating unit outputs the second drive signal to the transmitting unit, and the detecting unit performs reception determination regarding the reflected wave based on a frequency signal that corresponds to a waveform pattern of the reception signal and a reference signal that corresponds to a waveform pattern of the first drive signal, wherein at least the first transmission wave is encoded by frequency modulation, the first drive signal is formed such that a frequency changes with elapse of time in a first frequency band that is formed by a first minimum frequency and a first maximum frequency, the second drive signal is formed such that a frequency changes with elapse of time in a second frequency band that is formed by a second minimum frequency and a second maximum frequency, the first frequency band and the second frequency band are set so as to partially overlap each other, and the first frequency band and the second frequency band are set so as to include a resonance frequency of the transmitting unit.

8. The object detection apparatus according to claim 6, wherein:

the second minimum frequency is a higher frequency than the first minimum frequency, and the second maximum frequency is a higher frequency than the first maximum frequency; or the second minimum frequency is a lower frequency than the first minimum frequency, and the second maximum frequency is a lower frequency than the first maximum frequency.

9. An object detection apparatus that is configured to detect an object in a vicinity of a moving body to which it is mounted, the object detection apparatus comprising one or more processors configured to implement:

a drive-signal generating unit that is provided so as to generate a drive signal that drives a transmitting unit that includes a transmitter that transmits a transmission wave that is an ultrasonic wave externally, and output the drive signal to the transmitting unit; and a detecting unit that is provided to detect the object based on a reception signal that corresponds to a reception result of a receiver that receives a reception wave that includes a reflected wave from the object of the transmission wave, wherein the drive-signal generating unit generates a first drive signal that is the drive signal that corresponds to a first transmission wave that is included in a plurality of transmission waves that are continuously transmitted from a start of a transmission process of the transmission wave to an end of the transmission process, the first transmission wave encoded based on waveform patterns, and the drive-signal generating unit outputs the first drive signal to the transmitting unit, and generates a second drive signal that is the drive signal that corresponds to a second transmission wave that is included in the plurality of transmission waves and transmitted after the first transmission wave, and the drive-signal generating unit outputs the second drive signal to the transmitting unit, and the detecting unit performs reception determination regarding the reflected wave based on a frequency signal that corresponds to a waveform pattern of the reception signal and a reference signal that corresponds to a waveform pattern of the first drive signal, wherein the detecting unit performs the reception determination regarding the reflected wave based on a composite reference signal in which the reference signal that corresponds to the first drive signal and the reference signal that corresponds to the second drive signal are combined.

* * * * *